United States Patent
Bahr et al.

(10) Patent No.: US 9,906,409 B2
(45) Date of Patent: *Feb. 27, 2018

(54) METHOD AND DEVICES FOR RUNNING PUSH-BUTTON CONFIGURATION SESSIONS

(71) Applicant: SIEMENS AKTIENGESELLSCHAFT, Munich (DE)

(72) Inventors: Michael Bahr, Munich (DE); Rainer Falk, Poing (DE); Parag Mogre, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 81 days.

This patent is subject to a terminal disclaimer.

(21) Appl. No.: 14/364,939

(22) PCT Filed: Dec. 12, 2012

(86) PCT No.: PCT/EP2012/075288
§ 371 (c)(1),
(2) Date: Jun. 12, 2014

(87) PCT Pub. No.: WO2013/087723
PCT Pub. Date: Jun. 20, 2013

(65) Prior Publication Data
US 2014/0337952 A1    Nov. 13, 2014

(30) Foreign Application Priority Data

Dec. 12, 2011  (EP) .................................. 11009796
Dec. 12, 2011  (EP) .................................. 11009804

(51) Int. Cl.
*G06F 7/04* (2006.01)
*H04L 12/24* (2006.01)
(Continued)

(52) U.S. Cl.
CPC .......... *H04L 41/0806* (2013.01); *H04L 41/28* (2013.01); *H04L 63/083* (2013.01);
(Continued)

(58) Field of Classification Search
CPC .................................................... G06F 21/31
(Continued)

(56) References Cited

U.S. PATENT DOCUMENTS

2010/0281249 A1   11/2010   Das et al. ............... 713/151
2011/0090896 A1*   4/2011   Bradley ............... H04W 24/02
                                                            370/350
2012/0311683 A1*  12/2012   Klein ..................... H04L 63/06
                                                            726/6

FOREIGN PATENT DOCUMENTS

CN        101192254 A    6/2008    ........... G06F 17/30
CN        101599850 A   12/2009    ........... H04L 12/24
(Continued)

OTHER PUBLICATIONS

IEEE P1905.1, Draft Standard for a Convergent Digital Home Network for Heterogeneous Technologies, Proposal for CDHN Standard, pp. 1-79, Sep. 2011.
IEEE P1905.1™/D02, Draft Standard for Convergent Digital Home Network for Heterogeneous Technologies, pp. 1-81, Dec. 2011.
Stefan Nowak et al., "Towards a Convergent Digital Home Network Infrastructure," IEEE Transactions on Consumer Electronics, IEEE Service Center, vol. 57, No. 4, Dec. 27, 2011, pp. 1695-1703.
Wi-Fi Alliance, Wi-Fi Protected Setup Specification, Version 1.0h, Dec. 2006, pp. 1-110.
Wi-Fi Alliance, Wi-Fi Certified™ makes it Wi-Fi, http://www.wi-fi.org/wifi-protected-setup, downloaded Dec. 6, 2013, 1 page.
(Continued)

*Primary Examiner* — Christopher Brown
(74) *Attorney, Agent, or Firm* — Slayden Grubert Beard PLLC

(57) ABSTRACT

A method and a network node device run Push-Button Configuration sessions within a heterogeneous network, IEEE 1905.1, using a push button configuration mechanism that ensures that only one single new network node device is registered for a single push button key press event and thus overlapping Push-Button Configuration sessions within a heterogeneous network are prevented. After finishing the push button configuration mode, the number of new nodes is checked. If more than one node has been added, a configuration roll-back is performed. Preferably, the push button configuration roll-back is performed as soon as the authentication of more than one distinct node has been detected. The roll-back includes the deletion or deactivation of credentials established by the push-button configuration.

38 Claims, 12 Drawing Sheets

(51) Int. Cl.
*H04L 29/06* (2006.01)
*H04B 3/54* (2006.01)

(52) U.S. Cl.
CPC .......... *H04L 63/0876* (2013.01); *H04B 3/544* (2013.01); *H04L 63/065* (2013.01); *H04L 63/162* (2013.01)

(58) Field of Classification Search
USPC .......................................................... 726/6
See application file for complete search history.

(56) References Cited

FOREIGN PATENT DOCUMENTS

| | | | |
|---|---|---|---|
| CN | 101873590 A | 10/2010 | ............ H04W 12/06 |
| EP | 11009796.1 | 12/2011 | |
| EP | 11009804.3 | 12/2011 | |
| WO | PCT/EP2012/075288 | 12/2012 | |

OTHER PUBLICATIONS

Wikipedia, "Wi-Fi Protected Setup," http://en.wikipedia.org/wiki/Wi-Fi_Protected_Setup, Nov. 16, 2011, 3 pages.
Wikipedia, "Bluetooth," http://en.wikipedia.org/wiki/Bluetooth#Pairing.2FBonding, Dec. 9, 2011, 22 pages.
Written Opinion of the International Searching Authority for PCT/EP2012/075288, downloaded from WIPO website Jun. 12, 2014, 11 pages.
International Search Report for PCT/EP2012/075288, dated Mar. 20, 2013, 4 pages.
Chinese Office Action, Application No. 201280061282.5, 10 pages.

\* cited by examiner

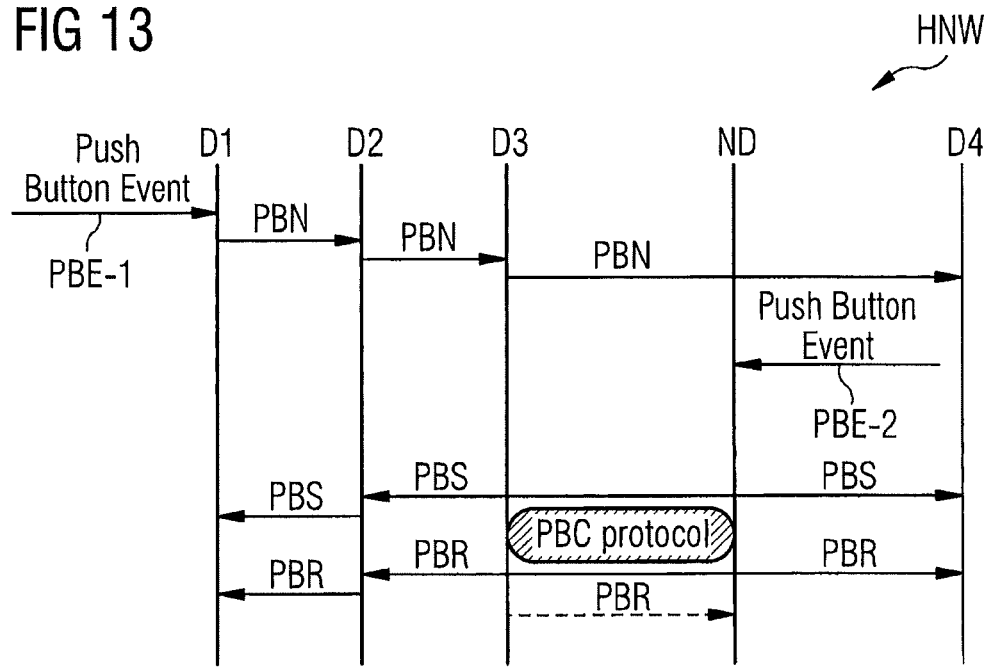
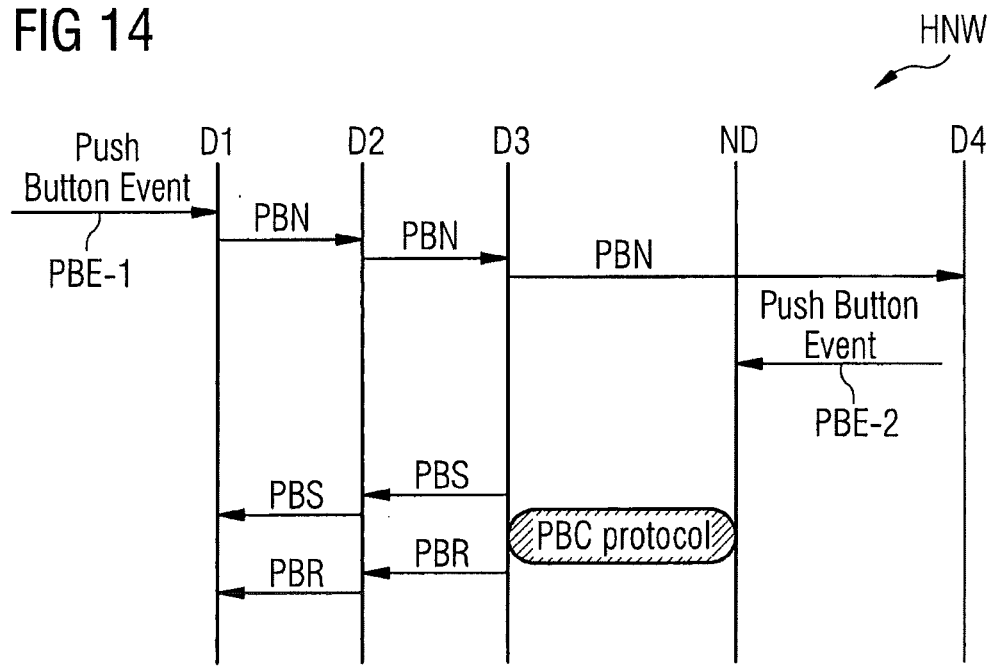

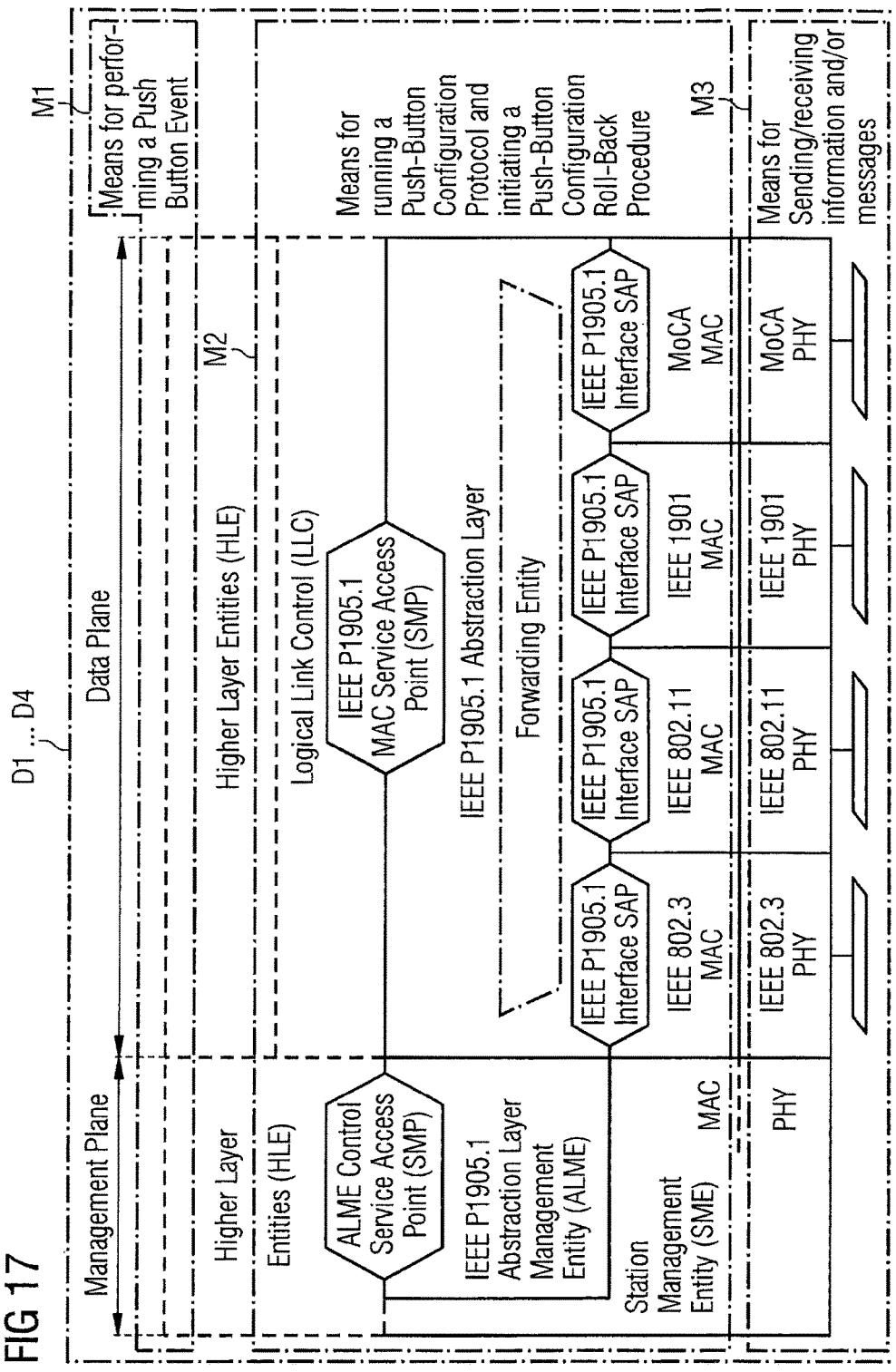

METHOD AND DEVICES FOR RUNNING PUSH-BUTTON CONFIGURATION SESSIONS

CROSS REFERENCE TO RELATED APPLICATIONS

This application is based on and hereby claims priority to International Application No. PCT/EP2012/075288 filed on Dec. 12, 2012 and European Application Nos. 11009796.1 filed on Dec. 12, 2011 and 11009804.3 filed on Dec. 12, 2011, the contents of which are hereby incorporated by reference.

BACKGROUND

The invention relates to a method for running Push-Button Configuration sessions within a heterogeneous network, a first network node device for running Push-Button Configuration sessions within a heterogeneous network, a second network node device for running Push-Button Configuration sessions within a heterogeneous network, a computer readable storage media executable by a processor to run Push-Button Configuration sessions within a heterogeneous network and a heterogeneous network for running Push-Button Configuration sessions.

The current data-centric use of networks (Internet access, media streaming) is increasingly extended towards home control functionality (home automation for climate control, lighting, burglar alarm, home energy network). Such home networks use according to FIG. 1 for instance various communication network technologies like Ethernet (IEEE 802.3), WLAN/WiFi (IEEE 802.11), and Power Line Communication (PLC; IEEE 1901). For this reason they are heterogeneous. The standard IEEE P1905.1, which is currently under development, defines a home network standard supporting different network technologies by a specified "IEEE P1905.1"-Abstraction Layer.

FIG. 2 shows the design of the abstraction layer based on the ISO/OSI-Reference Model with a management and data plane. The abstraction layer is embedded in an IEEE P1905.1-Architecture above a Media Access Control (MAC)-layer and a Physical layer as part of a "Network Node Device" NND within the heterogeneous network. Thus, the network node device NND uses the cited technologies like Ethernet (IEEE 802.3), WLAN/WiFi (IEEE 802.11), and Power Line Communication (PLC; IEEE 1901) and additionally a technology according to the specification of the Multimedia over Coax Alliance (MoCA) via corresponding interfaces according to FIG. 2. It is not compulsory or mandatory for a typical network node device to support all cited communication technologies. It is possible that the network node device NND supports only one or two of the cited technologies or completely other network technologies. Thus the network node device NND supports at least one network technology.

At least one goal of the IEEE P1905.1 standardization activities is the security mechanism during a setup or registration of a new device, called an "enrollee", which wants to join the heterogeneous network. The security mechanism is needed to protect the home network from external attacks. Such security mechanisms have to be configured with a security credential (password, passphrase, cryptographic key) that is burdensome to set-up manually.

Therefore there is a need for easy user-friendly setup of a security credential for a network supporting different communication network technologies such as using a push button configuration method.

The standard IEEE P1905.1 is currently under development. Section 9 of the current draft version (1905_1-11-0067-00-WGDC-proposal-for-cdhn-standard.doc) defines rudimentary signalling procedures for an automatic cross-technology security setup. However, important functionality is missing so far, especially for dealing with so-called overlapping sessions.

The closest technical solution is defined in Wi-Fi Protected Setup (WPS) (WPS Specification 1.0). Described is a monitoring for simultaneous push-button configurations (PBC). If a session overlap is detected, the push button configuration fails.

More detailed information follows below:
There exist different technologies for user-friendly security set-up specific for a single technology.

Bluetooth defines Pairing procedures (legacy and secure simple pairing) to set-up a secret key between two Bluetooth devices (see: http://en.wikipedia.org/wiki/Bluetooth#Pairing.2FBonding).

Wi-Fi Protected Setup (WPS) defined by the Wi-Fi Alliance is the de-facto standard for WLAN security setup (see: http://en.wikipedia.org/wiki/Wi-Fi_Protected_Setup and: http://www.wi-fi.org/wifi-protected-setup). As part of the Push Button Configuration (PBC) protocol run, a check for an overlapping session is performed. If an overlapping PBC session is detected, the set-up procedure is aborted. The simultaneous announcement by a single device on two frequency bands is not considered as session overlap.

According to the WPS Specification 1.0 WPS Specification 1.0 in Section 10.3, page 77 the following is known:
The button press or equivalent trigger event on the Enrollee causes it to actively search for a Registrar in PBC mode. However, the Enrollee MUST not proceed immediately with the Registration Protocol when it first discovers a Registrar. Instead, the Enrollee must complete a scan of all IEEE 802.11 channels that it supports to discover, if any other nearby Registrars are in a Push Button Configuration (PBC) mode. The Enrollee performs this scan by sending out probe requests with a Device Password ID indicating that the Enrollee is in PBC mode and receiving probe responses indicating a Selected Registrar with a PBC Device Password ID. During this scan, the Enrollee must abort its connection attempt and signal a "session overlap" error to the user if it discovers more than one Registrar in PBC mode. If a session overlap error occurs, the user should be advised through the Enrollee or the Registrar user interface (UI) or product literature to wait some period of time before trying again.

Note:
In the case of a dual-band access point (AP) and a dual-band station, the station may discover more than one registrar in the PBC mode. If the dual-band station does discover more than one registrar in the PBC mode, one each RF band, and the Universal Unique IDentifier (UUID) in the beacon and probe-response are the same for all RF bands, then the station shall not consider this to be a session overlap.

FIG. 3 shows the message chart (WPS PBC Message Exchange known from Error! Reference source not found.) for push-button configuration involving the new device to be registered (called Enrollee), an access point (AP) being in direct communication with the Enrollee and a Registrar that actually performs the registration (i.e. it establishes a credential with the Enrollee). The registration messages (M1 . . . M8) are embedded in EAP messages that are forwarded by the AP.

Before the actual registration starts, a monitoring is performed to detect an overlapping PBC session: After Button press B_E by the Enrollee, the Enrollee sends probe request messages indicating that it is in a PBC mode. The AP forwards the information to the registrar. After a button press B_R or an equivalent trigger event on the registrar, the registrar checks whether more than one Enrollee PBC probe request has been received by the Registrar within 120 seconds prior to the PBC button press on the Registrar (PBC Monitor Time). If more than one Enrollee PBC probe request has been received within the Monitor Time interval, the Registrar signals a session overlap error and refuses to enter PBC mode or perform a PBC-based Registration Protocol exchange. In general, the two buttons B_E and B_R may be pressed in any order as long as both are pressed within a 120 sec time interval.

Note:

The message SetSelectedRegistrar notifies the AP that the registrar is currently in PBC mode. So this message causes the change in behaviour of the AP that it answers with a PBC probe response message (positive answer "PBC" instead of negative answer "!PBC").

This technical solution has as main drawback that it is suitable only for a limited usage scenario:

Only a single technology (WLAN) is supported.

The case of multiple access points (nodes) belonging to the same (home) network and each of them being potentially used for the PBC is not considered.

"Appendix A" in WPS Specification 1.0 WPS Specification 1.0 in Section 13 describes a setup in which multiple registrars are supported, so that the user (Enrollee) has to select with which registrar it wants to register.

The current draft version of the standard IEEE P1905.1 1905_1-11-0067-00-WGDC-proposal-for-cdhn-standard-.doc includes the following description for the push button configuration in section 9.2.2 (P1905.1 PBC (Push Button Configuration) Setup Method):

The IEEE P1905.1 PBC method works between two IEEE P1905.1 devices on the same IEEE P1905.1 Network, even when these two devices do not include an IEEE P1905.1 interface of the same underlying network technology if they are bridged by a device with the same underlying network technologies.

An example of the IEEE P1905.1 PBC method is illustrated in FIG. 4 (Example of IEEE P1905.1 Push Button Event Notification and IEEE P1905.1 Push Button Configuration).

In section 9.2.2.1 "P1905.1 Push Button Event Handling" of the current IEEE P1905.1 Draft Version "1905_1-11-0067-00-WGDC-proposal-for-cdhn-standard.doc" it is said:

The handling of IEEE P1905.1 Management messages in IEEE P1905.1 Devices is a common behaviour (powering up the interfaces and generating a sequential message ID across all message types from the device).

If the physical or logical PBC button is pushed on an IEEE P1905.1 Device and if an underlying network specific Push Button Configuration sequence is not currently being performed on any of the network interfaces of this IEEE P1905.1 Device, then a Push Button Event is triggered on an IEEE P1905.1 Device If a Push Button event is triggered on an IEEE P1905.1 Device, then the Application Layer Management Entity (ALME) shall:

Generate an eventID for this Push Button Event

Send a Push_Button_Event Notification IEEE P1905.1 Multicast message over its Authenticated IEEE P1905.1 Links using §7.2 Relay Multicast Transmission Procedures Initiate the underlying network specific Push Button Configuration sequence on the IEEE P1905.1 interfaces supporting Push Button Configuration methods.

FIG. 5 describes how an IEEE P1905.1 Device handles an IEEE P1905.1 Push Button Event Notification message (Push Button Event Notification Handling).

The handling of IEEE P1905.1 Management messages in an IEEE P1905.1 Device is a common behaviour (powering up the interfaces and generating a sequential message ID across all message types from the device).

If an ALME receives an IEEE P1905.1 Push Button Notification message, then an IEEE P1905.1 ALME shall:

If an underlying network specific Push Button Configuration sequence is currently being performed of any of the network interface of the device, then ignore the message.

If the message SourceAddress and eventID are a duplicated notification for this given P1905.1 Push Button event, then ignore the message.

The aging of a SourceAddress and eventID pair is P1905.1_PBC_WALK_TIME.

P1905.1_PBC_WALK_TIME should be defined to be longer than the underlying network. No more than a single eventID need to be stored by the P1905.1 device since Push_Button_Event cannot be triggered or handled if an underlying network Push Button Configuration is in progress (cf. 3.2.3 & 3.2.5-1).

3) If message is not ignored, repropagate the received IEEE P1905.1 Push_Button_Event Notification message using §7.3 Relay Multicast Reception Procedures.

4) Initiate the underlying network specific Push Button Configuration sequence on all IEEE P1905.1 interfaces supporting Push Button Configuration methods.

In the following text, several figures with message flow charts are used to explain the described methods. All these message flow charts are based on the network topology shown in FIG. 6 (Network Topology for Message Flow Charts).

From the IEEE P1905.1 draft version 1905_1-11-0067-00-WGDC-proposal-for-cdhn-standard.doc it is further implicitly known that according to FIG. 7 (Push button configuration in IEEE P1905.1) a push button event on one network node device, e.g. a network node device D1, belonging to a heterogeneous home network activates a push button configuration mode on other network node devices D2 . . . D4 belonging also to the heterogeneous home network. The network node devices D1 . . . D4 are part of the existing IEEE P1905.1 network and thus authenticated IEEE P1905.1 devices. The network node device D1 sends a push button notification message PBN to some or all other nodes belonging to the heterogeneous home network. The PBN message may be sent directly or forwarded by an intermediate network node device. It is preferred to send the PBN message by broadcast (relayed multicast) to all network node devices in the heterogeneous network. The PBN message as specified in the current version of the IEEE P1905.1 draft standard contains a TLV type (Type Length Value), a message type, event id fields. A technology-specific Push Button Configuration protocol (PBC protocol) is executed between a new device ND (not yet part of the home network) and a network node device D3. After finishing the technology-specific PBC protocol, the new device ND is part of the heterogeneous home network.

FIG. 8 (Push button configuration in IEEE P1905.1 showing an attacker node AN) shows based on FIG. 7 an example of an attack scenario. An attacker node device AN runs a push button configuration protocol as well, here with the network node device D4. So, after finishing the PBC protocol, the attacker network node device AN is now part of the home network. As different nodes may use even heterogeneous communication technologies, and therefore different technology-specific PBC protocols, the network node device D3 (and the new device ND) may not even detect the second PBC protocol run.

The specific problem of using a push-button configuration in a P1905.1 network comes from the fact that multiple devices (belonging even to different technologies and possibly connected via multiple hops) are activated to accept a new device. So in the current version of the standard, more than one device could register with the P1905.1 network after a single button press. An attacker node may therefore register undetected when an authorized registration of a new device takes place.

Moreover, changes to the existing Push Button Configuration methods of the underlying link communication technologies, e.g. WPS for Wi-Fi, are very difficult to do due to the need for changes in existing specifications as well as for interoperability with the already installed devices.

SUMMARY

One possible object is to specify a method and a network node device for running Push-Button Configuration sessions within a heterogeneous network and a heterogeneous network using a push button configuration mechanism suitable for a heterogeneous home network (with possibly multiple hops between devices) that ensures that only one single new network node device is registered for a single push button key press event. Thus overlapping Push-Button Configuration sessions within a heterogeneous network are prevented.

The inventors propose an enhanced mechanism for running Push Button Configuration sessions based on a Push-Button Configuration protocol run triggered and initiated by a virtual or physical Push-Button-Event on a new device, which wants to join the heterogeneous network, for a user friendly security bootstrapping, in which multiple network node devices, especially of different communication technologies and possibly connected over multiple hops, in the heterogeneous network belonging already to the heterogeneous network, e.g. because of a previous successful authentication, are involved in registering the new device (enrollee) by at least running the Push-Button Configuration protocol with the new device. Thus on one hand, each network node device could be principally adapted to be an originator network node device, which broadcasts a notification message to other authenticated network node devices triggered by a virtual or physical Push-Button-Event being released on the originator network node device before. On the other hand, the originator network node device could process the Push-Button Configuration protocol run and the registration of the new device alone or with the support of at least one other authenticated network node device.

If now more than one new device is included in the heterogeneous network by a single virtual or physical Push-Button-Event and if more than one new device tries to enter the network, then after finishing the push button configuration session based on more than one Push-Button Configuration protocol run, whereby especially the session is time out limited, the number of new nodes is checked and if more than one new network node device has been added, for each new network node device a Push-Button Configuration roll-back procedure is initiated and/or performed in order to delete or deactivate credentials established with the authenticated new network node device.

Beneficial self-improvements of the facts discussed above are covered separately for two different embodiments concerning a decentralized push button configuration session and concerning a centralized push button configuration session.

Preferably, the push-button configuration roll-back is performed as soon as the authentication of more than one distinct new network node device has been detected. This detection of overlapping Push-Button Configuration sessions within the heterogeneous network could be done decentrally, where all network node devices or any network node device in the network check the number of PBC protocol runs and take a corresponding action, such as a roll back of the PBC protocol runs, in a distributed, decentralized way or centrally, where an originator network node device, e.g. a first network node device, in the network checks the number of PBC protocol runs and take a corresponding action, such as a roll back of the PBC protocol runs, in a non-distributed, centralized way.

Thus the number of new network node devices resp. the number of PBC protocol runs may be checked decentrally for only one new network node device resp. one PBC protocol run (FIG. 9) and for more than two new network node devices resp. more than two PBC protocol runs (FIG. 15) or centrally for only one new network node device resp. one PBC protocol run (FIG. 10) and for more than two new network node devices resp. one PBC protocol runs (FIG. 16). For checking the number of more than two new network node devices resp. more than two PBC protocols runs different beneficial means/methods could be used:

All network node devices of the home network that have completed a PBC protocol run, report the result to the initiator (e.g. the originator network node device). The number of events received after the push button press event within a time limit (e.g. 120 sec) is counted (cf. FIG. 16). The initiator will initiate the roll-back of the push button configuration protocols if necessary.

Decentralized methods, where all network node devices or any network node device in the network check the number of PBC protocol runs and take a corresponding action, such as a roll back of the PBC protocol runs, in a distributed way.

All network node devices of the home network that have completed a PBC protocol run, report the result to all network node devices in the network, that is, to all network node devices that received the PBN message. The number of events resp. the number of new devices received after the push button press event within a time limit (e.g. 120 sec) is counted. Any of the network node devices, but at least one of them will initiate the roll-back of the push button configuration protocols if necessary.

All network node devices of the home network that have completed a PBC protocol run, report the result to all network node devices in the network, that is, to all network node devices that received the PBN message. If a network node device that has completed a PBC protocol run receives a message reporting the result of a different PBC protocol run for a different new device after the push button press event within a time limit (e.g. 120 sec), the network node device will initiate the roll-back of the push button configuration protocols.

All network node devices of the home network that have completed a PBC protocol run, report the result to all network node devices in the network, that is, to all network node devices that received the PBN message. If a network node device that has completed a PBC protocol run receives a message reporting the result of a different PBC protocol run for a different new device after the push button press event within a time limit (e.g. 120 sec), the network node device will initiate the roll-back of its own push button configuration protocol. All completed PBC protocol runs will be rolled back, since this behaviour will occur at all devices that completed a PBC protocol run (cf. FIG. 15, devices D3 and D4).

A network node device discovery is performed (e.g. by sending a broadcast message within the home network to which all nodes are expected to answer). This is then preferably compared with the previously discovered number of devices in order to determine the new number of discovered devices.

Detecting communication of a new network node device (in particular UPnP messages for auto-configuration).

A simple push button configuration mechanism can be securely used in a home network comprising multiple network node devices supporting a push button configuration mechanism (i.e. there exists not only a single access point within the home network as it is assumed today). A secure push button configuration can be performed in heterogeneous home networks, i.e. in which different communication technologies as e.g., Ethernet, WLAN, PLC, MoCA, etc. are used each alone or simultaneously.

The proposals pay special attention to the fact, that the MAC-technology specific push button configuration is like a black box to the IEEE P1905.1 abstraction layer and cannot be change or intercepted with new interfaces. With the proposals, the MAC-technology specific push button configuration can remain unchanged while the methods for the detection of multiple new devices authenticating during the same push button event can start as early as possible.

The proposals provide a decentralized and distributed method for detecting overlapping PBC protocol runs for multiple new devices in a heterogeneous home network. No node receives a special role, which avoids even temporary single points of failures.

This document describes in the preferred embodiments several alternatives that provide increased explicit information and can be used for smarter decisions.

However, according to one aspect that there is only one new device trying to enter the network, then after finishing the push button configuration session based on only one Push-Button Configuration protocol run, whereby especially the session is again time out limited, a Push-Button Configuration result message in a decentralized push button configuration session is transmitted by broadcast or by relayed multicast respectively broadcasted or relayed multicasted to all authenticated network node devices in the network or in a centralized push button configuration session is sent directly or indirectly preferably to the originator network node device.

BRIEF DESCRIPTION OF THE DRAWINGS

These and other objects and advantages of the present invention will become more apparent and more readily appreciated from the following description of the preferred embodiments, taken in conjunction with the accompanying drawings of which.

Such home networks use according to FIG. 1 for instance various communication network technologies like Ethernet.

Figure 1:
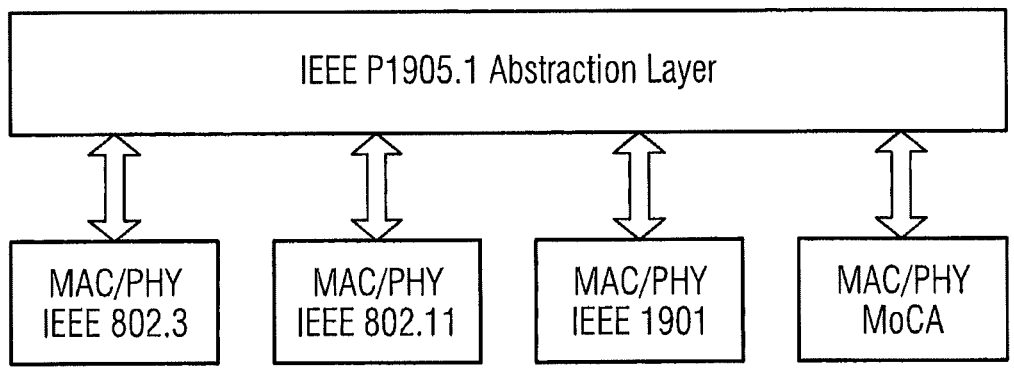
Figure 2:
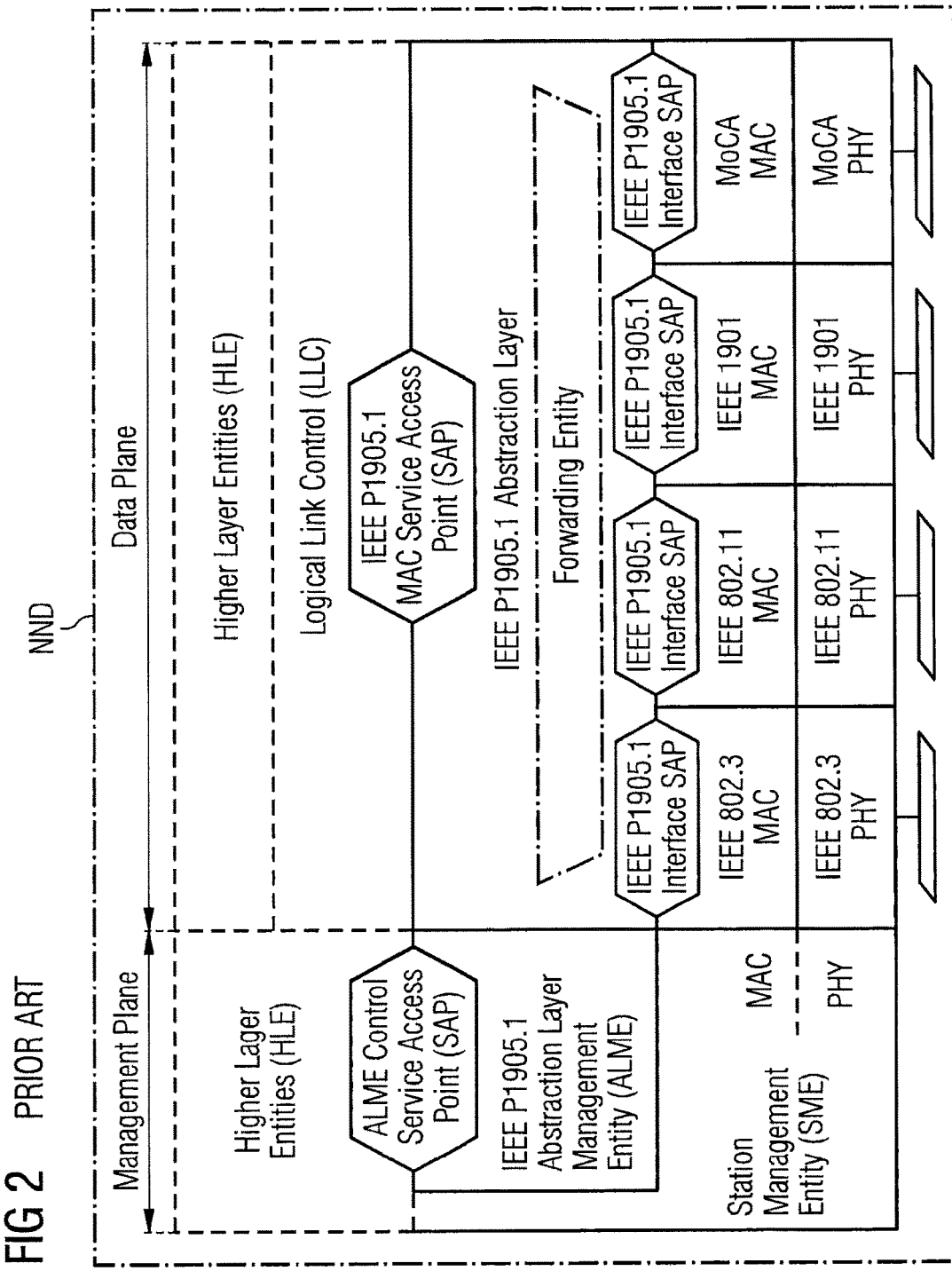
FIG. 2 shows the design of the abstraction layer based on the ISO/OSI-Reference Model with a management and data plane.
Figure 3:
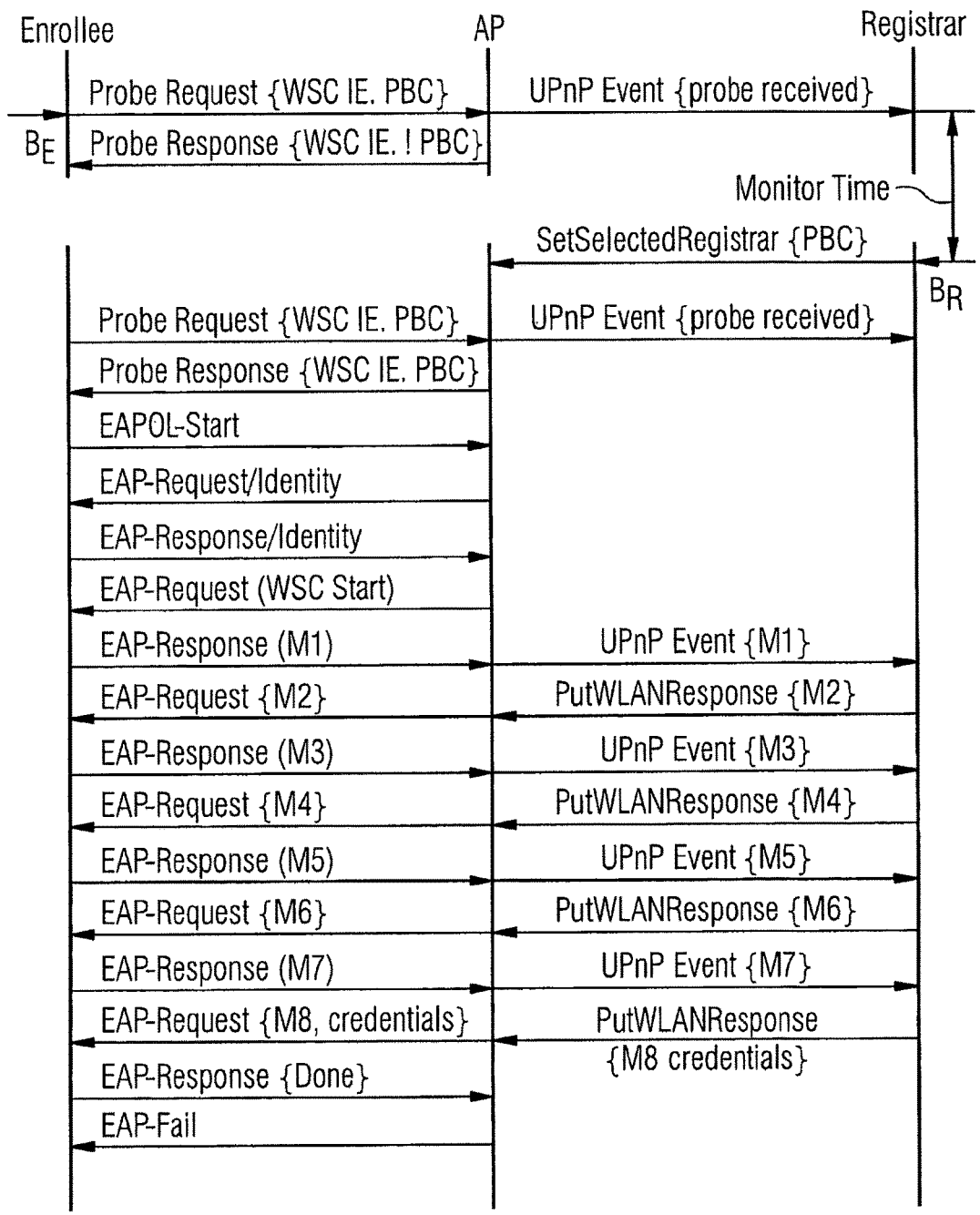
FIG. 3 shows the message chart (WPS PBC Message Exchange known from Error! Reference source not found.) for push-button configuration involving the new device to be registered (called Enrollee), an access point (AP) being in direct communication with the Enrollee and a Registrar that actually performs the registration (i.e. it establishes a credential with the Enrollee)
Figure 4:
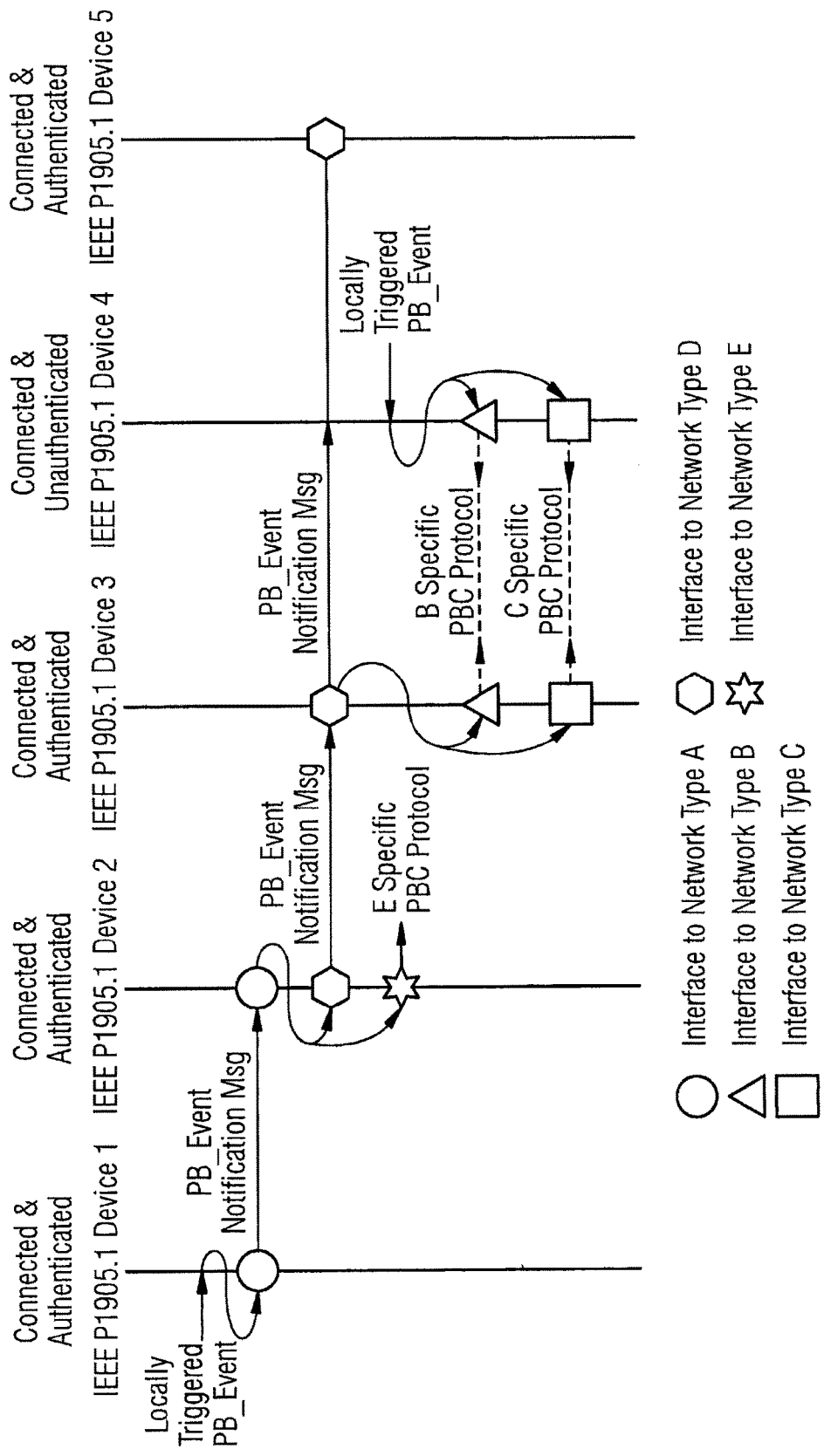
Figure 5:
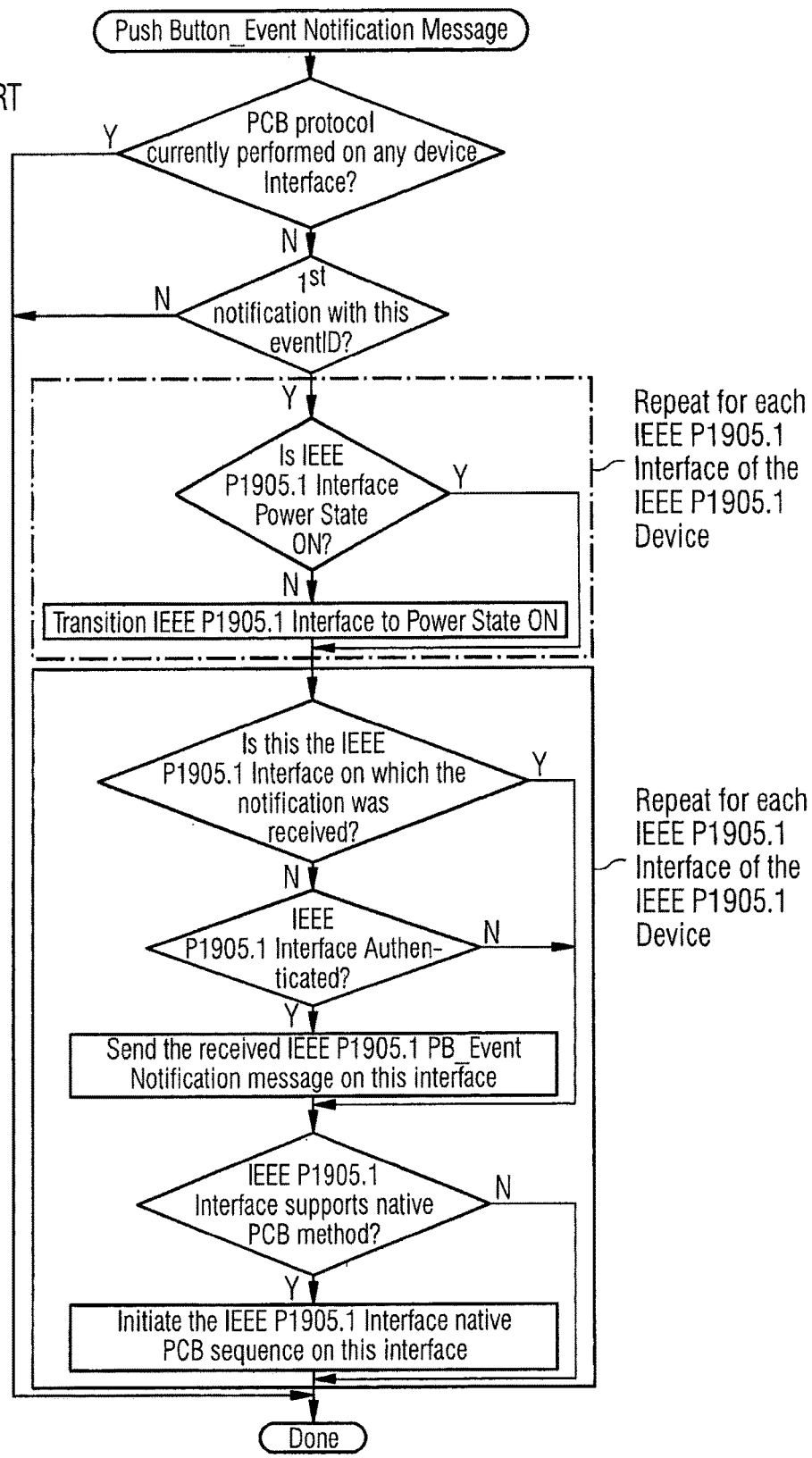
Figure 6:
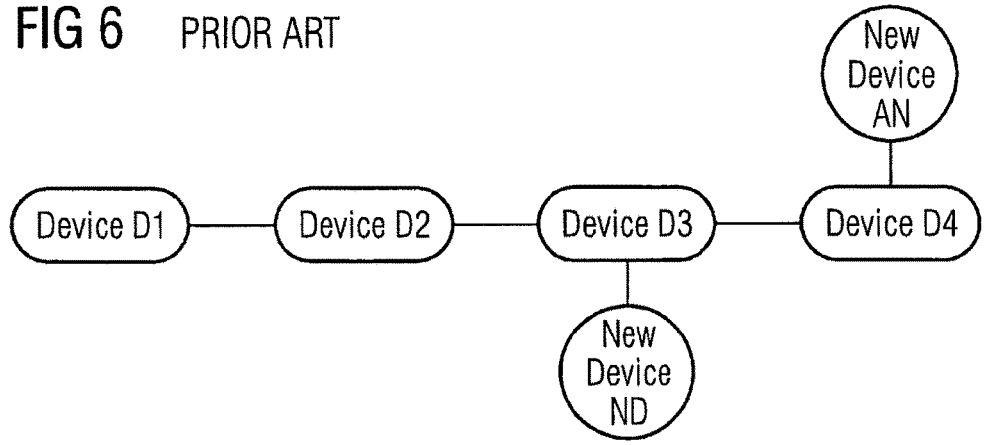
Figure 7:
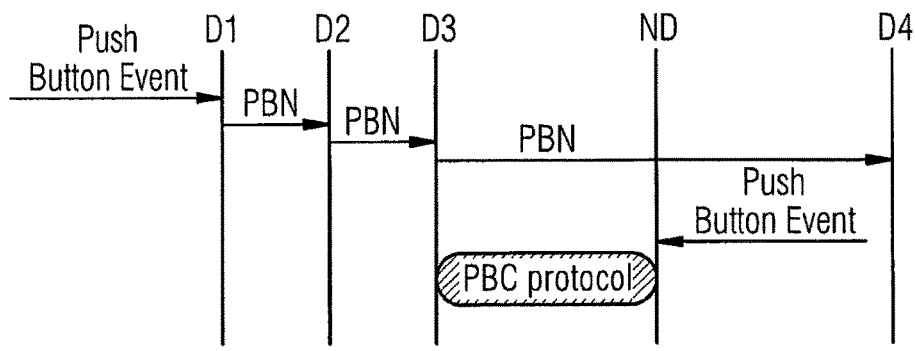
Figure 8:
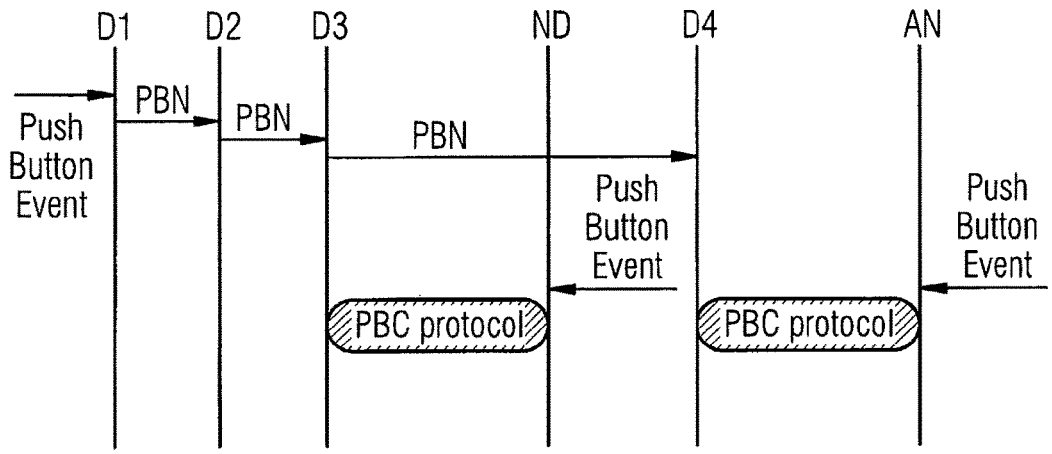
Figure 9:
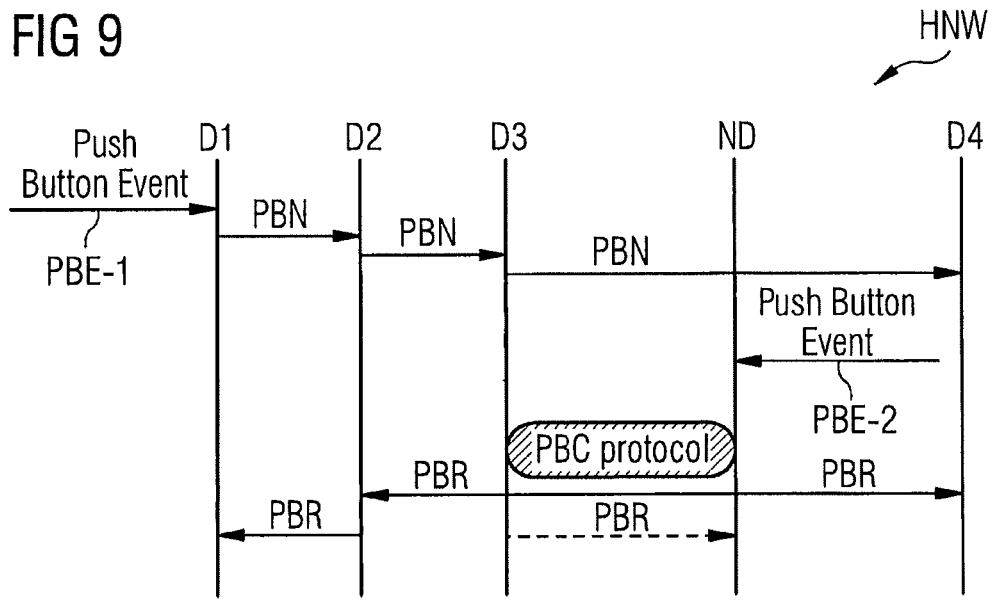
Figure 10:
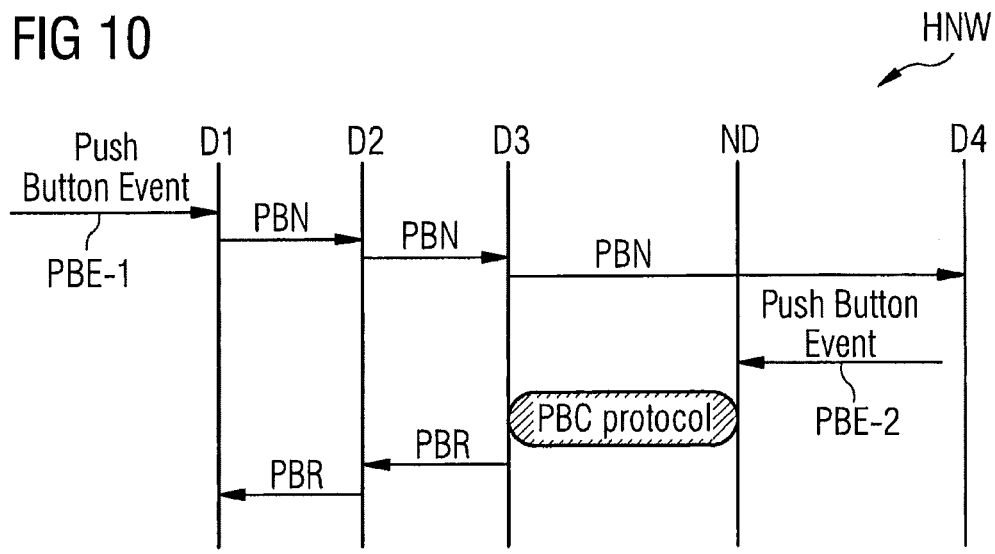
Figure 11:
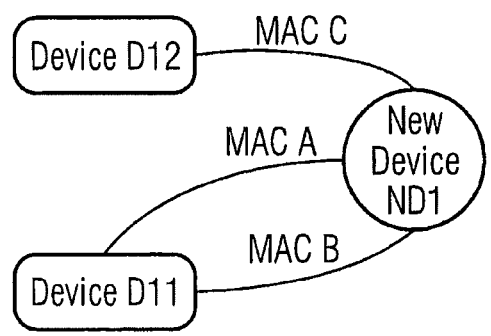
Figure 12:
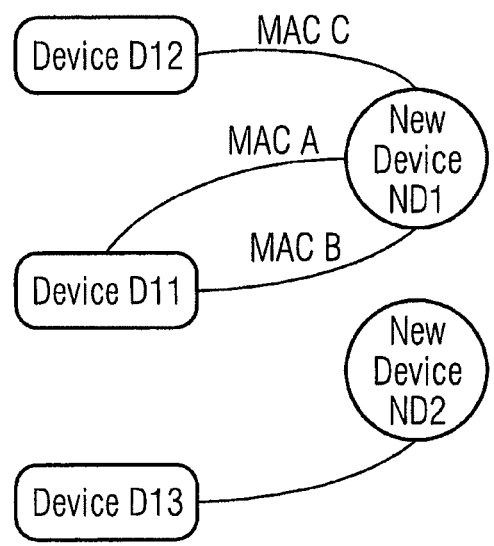
Figure 15:
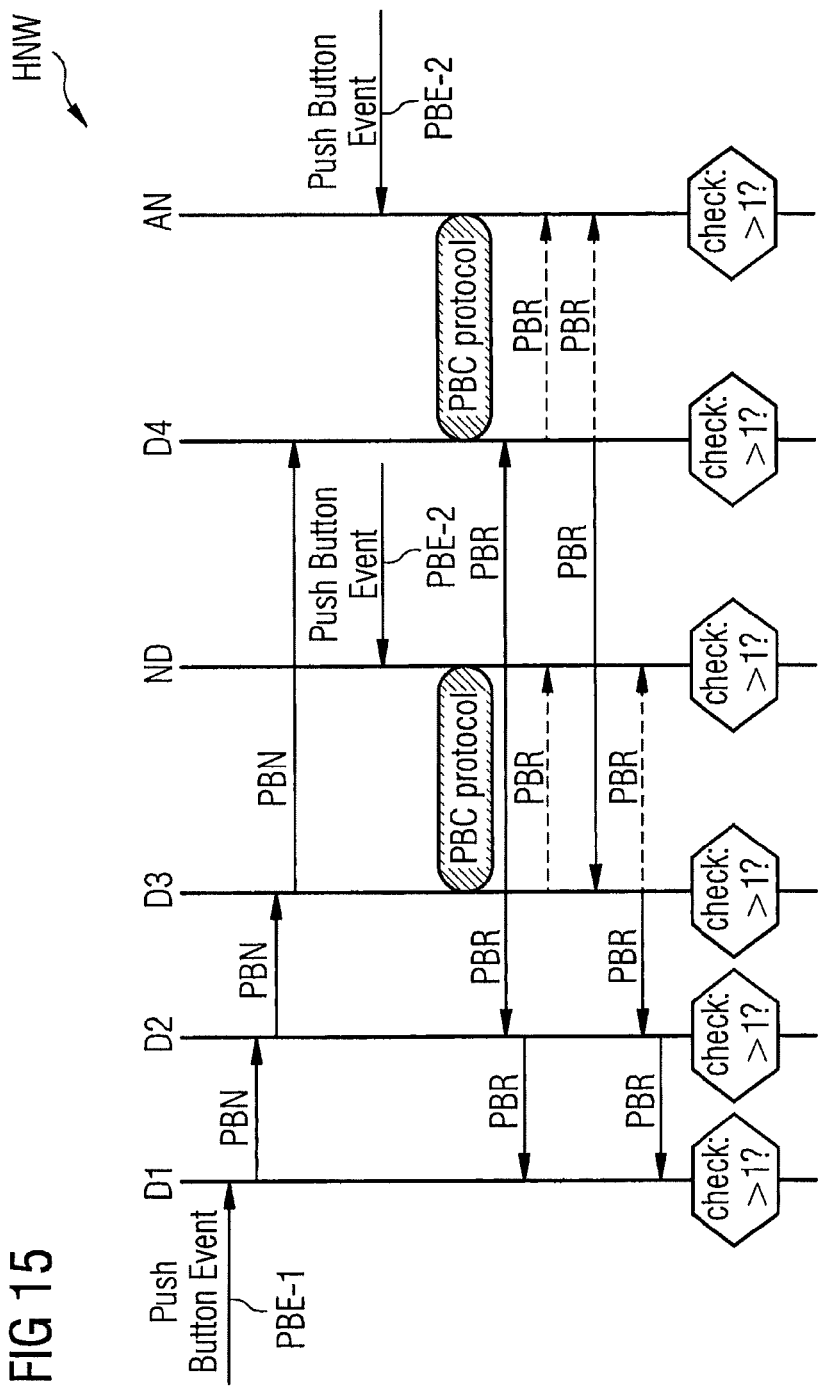
Figure 16:
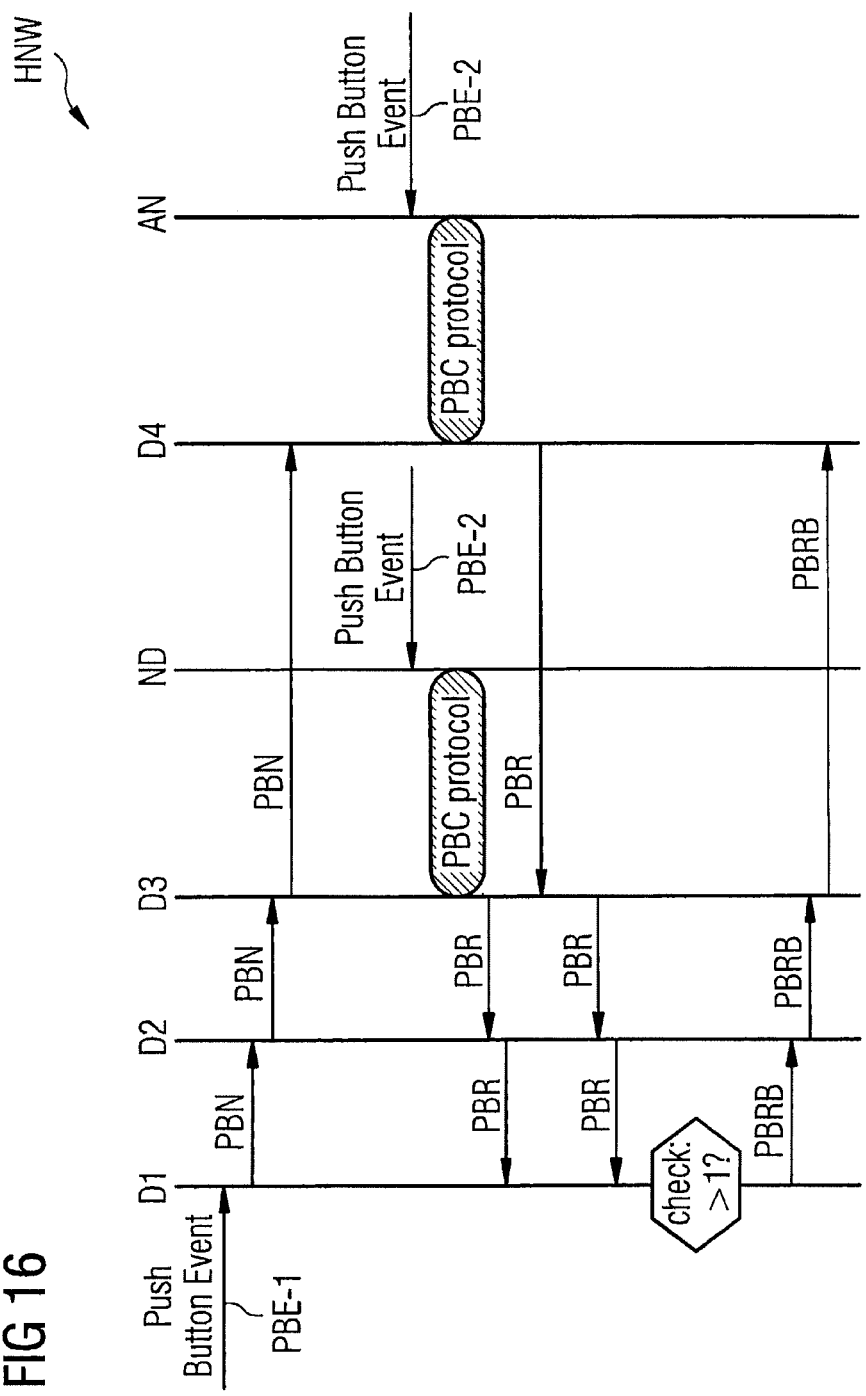

An example of the IEEE P1905.1 PBC method is illustrated in FIG. 4;

FIG. 5 describes how an IEEE P1905.1 Device handles an IEEE P1905.1 Push Button Event Notification message (Push Button Event Notification Handling);

FIG. 6 shows Network Topology for Message Flow Charts;

FIG. 7 shows Push button configuration in IEEE P1905.1;

FIG. 8 shows Push button configuration in IEEE P1905.1 showing an attacker node AN based on FIG. 7 an example of an attack scenario;

FIG. 9 a message flow for reporting a completed Push Button Configuration protocol run according to a first embodiment;

FIG. 10 a message flow for reporting a completed Push Button Configuration protocol run according to a second embodiment;

FIG. 11 Scenario for multiple Push Button Configurations with one new device;

FIG. 12 Scenario for multiple Push Button Configurations with multiple new devices;

FIG. 13 a message flow for sending a Push Button status message according to the first embodiment;

FIG. 14 a message flow for sending a Push Button status message according to the second embodiment;

FIG. 15 a message flow for an extended Push Button Configuration with multiple new devices showing a roll-back procedure/mechanism according to the first embodiment;

FIG. 16 a message flow for an extended Push Button Configuration with multiple new devices showing a roll-back procedure/mechanism according to the second embodiment;

FIG. 17 the structure of a network node device for processing the reporting of a completed Push Button Configuration protocol run according to the first and second embodiment and for an extended Push Button Configuration with multiple new devices showing the roll-back procedure/mechanism based on the abstraction layer embedded in the IEEE P1905.1-Architecture above the Media Access Control (MAC)-layer and the Physical layer according to FIG. 2.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

FIG. 9 shows a Push-Button Configuration session running in a heterogeneous network HNW with a plurality of network node devices D1 . . . D4, ND interconnected to each other via at least one interface and/or over multiple hops thereby exchanging several Push Button Configuration messages according to a first embodiment showing a decentralized message flow respectively Push-Button Configuration session. The dotted message flow indicates that the reception of this message depends on the authentication status or progress of the PBC protocol of a receiving device (unauthenticated vs. authenticated).

FIG. 10 shows a Push-Button Configuration session running in a heterogeneous network HNW with a plurality of network node devices D1 . . . D4, ND interconnected to each other via at least one interface and/or over multiple hops thereby exchanging several Push Button Configuration messages according to a second embodiment showing a centralized message flow respectively Push-Button Configuration session.

Sending Push Button Notification messages (PBN) in the FIGS. 9 and 10

A first network node device D1 receives a first physical or virtual push button event PBE-1 and sends a Push Button Notification message PBN to the other authenticated network node devices D2 . . . D4 (second network node devices). The effect is that the first push button event PBE-1 is forwarded to all authenticated nodes of the network. The push button event will be valid for a certain duration/period of time, e.g. 120 seconds. This time duration/period is named in the following as an "IEEE P1905.1 PBC walk time". The first network node device D1 that received the push button event and sent the PBN message is often called "push button event originator" in the following text. Also the expression originator network node device is used sometimes.

An useful information in the Push Button Notification message PBN is preferably:
Being a push button notification: This can be indicated by a unique message identifier (message type) for the message, or by a unique TLV identifier (TLV type) for a push button notification TLV or information element included in a message.

Identifier (ID) of the push button event: Such a unique event ID allows to distinguish different push button events. It also allows an explicit relationship between different message exchanges that are related to the same push button event. Without an event ID, the relationship to a push button event has to be determined based on time (IEEE P1905.1 PBC walk time). Or more specifically, all PBC actions relate to the currently valid push button event.

Sender or originator of push button notification message: This is needed to eliminate any possible ambiguities with the event ID. Furthermore, the sender/originator of the PBN message might be the recipient of some messages. Providing the address of the sender/originator of the PBN message provides the destination address for other PBC related messages. The address of the sender/originator of the PBN message can be given by the sender address of the message (if available) or by a corresponding field in a push button notification TLV or information element or a header field included in a message.

The PBN message preferably includes the sender address of the first (originator) network node device D1 (e.g. MAC-Address, IP-address, IEEE P1905.1 address, Abstraction Layer Identifier). It may include a push button event ID that may be stored by a second network node device D3 and included in a Push Button Configuration Result message PBR. The event ID together with the sender address uniquely identifies the Push Button Event Notification message PBN, and therefore the Push Button Event.

When an IEEE P1905.1 network node device received the first Push Button Event PBE-1 (e.g. the first network node device D1) or the Push Button Event Notification message PBN (e.g. the second network node devices D2, D3, D4) and set its status to having a valid push button event for the next IEEE P1905.1 PBC walk time [a specific time interval, either set by the network operator or chosen by the network itself based on relevant parameters, e.g. walk times of MAC-technology-specific push button configuration protocols, network diameter, Quality of Service (QoS), etc.], the network node device gives the push button event to all its underlying MAC technologies that are capable of processing a push button event. In other words, the IEEE P1905.1 node "pushes the button" or "presses the push button" at the underlying MAC technologies after the reception of a PBN message.

At this point, the IEEE P1905.1 node usually does not know whether there is a new device waiting for running the PBC protocol. Furthermore, the flow of control goes over to the underlying, MAC-specific and technology specific Push Button Configuration protocol. This technology specific PBC protocol is a black box to the IEEE P1905.1 device, and the device can only use the interfaces provided by the specific underlying technology. Some feedback, e.g. whether there is a new device that wishes to authenticate, or whether a PBC run is going to start or is in progress, might be given to the IEEE P1905.1 device depending on the technology. Feedback on the PBC run is usually available to the IEEE P1905.1 device after the (successful or failed) push button configuration.

The second network node device D3 of the home network has received feedback about a PBC protocol run, triggered by a second physical or virtual Push Button Event PBE-2 at a new device ND (third network node device), which wants to join the heterogeneous network HNW. Within this text, "to have received feedback" means one of the following:

The abstraction layer of the node received some information from the technology specific PBC protocol that a PBC protocol run is going to be started.

The abstraction layer of the node received some information from the technology specific PBC protocol that a PBC protocol run is in progress.

An operator or protocol specified time-out has passed since the start of the technology specific PBC configuration. Here, if there is no explicit error message signalled to the abstraction layer management entity (ALME) by the technology specific PBC then that is assumed to have completed successfully. This is equivalent to having received implicit positive feedback of the completion.

The abstraction layer of the node received some information from the technology specific PBC protocol that a PBC protocol run has been completed.

The first two might be available only with a few communication technology specific PBC protocols. The last one is usually available with any technology-specific PBC protocol. Due to this, "to have received feedback about the PBC protocol run" (or from the PBC protocol) is often synonymous with "after completing the PBC protocol run" (or the PBC protocol) but it does not exclude information received before or during the PBC protocol. The earlier the device can react to a PBC protocol run the better.

Sending Push Button Configuration Result Messages (PBR) in the FIGS. 9 and 10

After receiving feedback from the PBC protocol, the second network node device D3 sends according to FIG. 9 a Push Button Configuration Result message PBR (third Push Button Configuration result message PBR) to all authenticated nodes in the network preferably by broadcast (relayed multicast) and according to FIG. 10 a Push Button Configuration Result message PBR (fourth Push Button Configuration result message PBR) to the initiating first (originator) network node device D1 [according to FIG. 10 indirectly via an other second network node device (intermediate network node device) D2]. If the second network node device (intermediate network node device) D2 was the network node device, which received a feedback from the PBC protocol, it would sent directly a Push Button Configuration Result message PBR (fourth Push Button Configuration result message PBR) to the initiating first (originator) network node device D1.

The PBR message is sent directly to the Push Button Event originator network node device D1 preferably by unicast (possibly over multiple hops). Such an authenticated network node device as the device D3 that has received feedback from the MAC-technology specific PBC protocol is sometimes called the "P1905.1 registrar" or "registrar node or device" in the text.

Note in general and according to FIG. 9, the PBR message transmitted by broadcast may or may not be transmitted to the new network node device ND, depending on the status of its PBC run which determines whether it is an authenticated or an unauthenticated device.

In a very basic alternative of the Push Button Configuration Result message PBR, the relevant information of the PBR message includes only the information that this is a PBR message. This information can be provided by a unique message ID (message type) for the message, or by a unique TLV ID (TLV type) for a push button notification TLV or information element or a header field included in the message.

This will detect multiple runs of PBC protocols for a specific Push Button Event. However, it is especially important, that a network node device does not receive the same PBR message twice during the broadcast process or relayed multicast (detection of duplicate PBR messages). In this very basic alternative, this can be achieved with unique message IDs or message sequence numbers.

In a network with heterogeneous technologies for the communication links, however, this (i.e. the basic alternative of the Push Button Configuration Result message PBR) might lead to "false positives".

FIG. 11 shows a scenario for multiple Push Button Configurations with one new device where this can happen.

In a case with respect to the first embodiment, the devices in the network, either all network node devices in the network (with or without the new network node device) or only the Push Button Event originator network node device, receive three Push Button Configuration Result (PBR) messages, one from device D12 and two from device D11. (Preferably, an originator of a PBR message does not receive its own message. Therefore, the number of received PBR messages is smaller for an originator of a PBR message). The network devices or the Push Button Event originator network node device will determine overlapping push button configurations, although it is the very same new node which performed all three PBC runs over different MAC technologies with two different authenticated devices.

In order to detect such a situation, it is necessary that the IEEE P1905.1 address or abstraction layer identifier of the new device is included in the PBR message and sent to all network node devices in the network (with or without the new network node device) (cf. FIG. 9) or to the Push Button Event originator network node device (cf. FIG. 10). This definition of the PBR message containing the IEEE P1905.1 address or abstraction layer identifier of the new device is the preferred alternative for the PBR message.

The recipients of the PBR messages can now detect multiple PBR messages for the same new device.

In a case with respect to the second embodiment, the Push Button Event Originator will receive 3 Push Button Configuration Result (PBR) messages, one from device D12 and two from device D11. The Push Button Event Originator will determine overlapping push button configurations, although it is the very same new node which performed all three PBC runs over different MAC technologies with two different authenticated devices.

In order to detect such a situation, it is necessary that the IEEE 1905.1 address or abstraction layer identifier of the new device is included in the PBR message and sent to the Push Button Event originator. This definition of the PBR message containing the 1905.1 address or abstraction layer identifier of the new device is the preferred alternative for the PBR message. The push button configuration result message (PBR) message may also contain a Boolean parameter which indicates whether the technology specific PBC was successful or not. This enables additional flexibility to notify nodes in the network about failed technology specific PBCs (either due to an attacker node being blocked by the technology specific PBC or due to some other reason). The PBR message may contain further information on the technology-specific PBC.

The Push Button Event originator, that is, the recipient of the PBR messages, can now detect multiple PBR messages for the same new device. In FIG. 11 it would only count one new device, which is an acceptable situation.

FIG. 12 shows a scenario for multiple Push Button Configurations with multiple new devices where this can happen.

According to both embodiments the devices would only count one new device, which is an acceptable situation. In the FIG. 12, however, the devices in the network receive four PBR messages, one from device D12 for ND1, two from device D11 for ND1, and one from device D13 for ND2. The network devices will correctly detect the unwanted situation of two new devices for a single push button event.

Preferably, the registrar device will check for the same new device when it gets feedback from the PBC protocol. If the registrar device gets feedback from the PBC protocol for a new device, for which it already has sent a PBR message, the registrar device omits the other PBR messages for this new device. In the FIG. 12, all the network node devices in the network (with or without the new network node device) (cf. FIG. 9) or the Push Button Event originator network node device (cf. FIG. 10) receive only three PBR messages with this alternative method, one from device D12 for ND1, only one from device D11 for ND1, and one from device D13 for ND2. All the network node devices in the network (with or without the new network node device) or the Push Button Event originator network node device will still correctly detect the unwanted situation of two new devices for a single push button event.

It might be the case, that the feedback received from the MAC-technology specific PBC protocol run does not include the IEEE P1905.1 address or abstraction layer ID of the new device. If this is the case, the node waits for a certain time in order to derive the IEEE P1905.1 address or abstraction layer ID, preferably from messages of the abstraction layer, for instance, topology discovery messages or neighbor discovery messages. If the waiting time is exceeded, the node sends a PBR message without the IEEE P1905.1 address or abstraction layer ID to all authenticated network node devices in the network (with or without the new network node device) or to the Push Button Event originator network node device.

This is a fallback to the above described basic alternative for this node. The situation that there is no specific IEEE P1905.1 address or abstraction layer ID is available can be indicated, for instance:

by a flag indicating the presence of the IEEE P1905.1 address/abstraction layer ID field, or by a flag indicating that the content of the IEEE P1905.1 address/abstraction layer ID field shall be ignored, or by a special IEEE P1905.1 address/abstraction layer ID, for instance, the respective broadcast address.

Further advantages and preferable extensions of the Push Button Configuration Result (PBR) message according to the two embodiments (first embodiment: decentralized PBC session according to FIG. 9 and second embodiment: centralized PBC session according to FIG. 10) are:

Both Embodiments

A unique event ID, preferably a sequential integer, generated at the authenticated devices that performed the MAC technology specific PBC protocol run. In the preferred embodiments, this is the second network node device D3; in general it is the sender of the PBR message.

Both Embodiments

The sender or originator of the PBR message: This is needed to eliminate any possible ambiguities with the event ID. Furthermore, the sender/originator of the PBR message might be the recipient of some messages. Providing the address of the sender/originator of the PBR message provides the destination address for other PBC related messages. The address of the sender/originator of the PBR message can be given by the sender address of the PBR message (if available) or by a corresponding field in a push button result TLV or information element or a header field included in a message. Furthermore, in the basic alternative of the PBR message, the sender/originator address can be used to distinguish at least some PBR messages.

Second Embodiment

The receiver of the PBR message: This is the push button event originator. The sender is given in the message header. It is necessary for transmission of the PBR message. However, it is also advantageous to include the address of the push button event originator network node device into the information element or TLV for the push button result. This puts all necessary and interesting information into the same scope—the message header can be discarded as long as the information element or TLV is stored.

First Embodiment

The push button event originator: It is advantageous to include the address of the push button event originator network node device into the information element or TLV for the push button result. This puts all necessary and interesting information into the same scope—the message header can be discarded as long as the information element or TLV is stored. Furthermore, the push button event originator resolves any ambiguities with the event ID of the push button event.

Both Embodiments

The event ID of the push button event: This relates the push button configuration result (PBR) message to a specific push button event. As long as the PBR message is received within the validity of the push button event, the relationship can be derived easily. However, due to some timings and waiting times, it might be the case that the PBR message arrives only after the push button event already expired, or even worse, there has been already the next push button event. Such an unfavorable timing might happen, if the user presses the push button on the new device shortly before the walk time expires, and the waiting time for learning the IEEE P1905.1 address/abstraction layer ID is rather long.

First Embodiment

A Boolean parameter which indicates whether the technology specific PBC was successful or not. This enables additional flexibility to notify network node devices in the network about failed technology specific PBCs (either due to an attacker node being blocked by the technology specific PBC or due to some other reason).

First Embodiment

Further information on the technology-specific PBC.

According to FIGS. 13 and 14 it is each an beneficial self-improvement of the first embodiment based on the FIG. 9 and the corresponding description (FIG. 13) and the second embodiment based on the FIG. 10 and the corresponding description (FIG. 14) that the second network node device D3 may send a push button status message PBS to all the network node devices in the network (with or without the new network node device) (cf. FIG. 9) or the Push Button Event originator network node device (cf. FIG. 10), when it received feedback from the technology-specific PBC protocol run. This PBS message is in addition to the PBR message, and is sent before the PBR message. The PBS message is an announcement or that there is a PBR message supposed to arrive later from the same sender. This is especially useful, if the waiting time for the IEEE P1905.1 address or abstraction layer ID extends over the validity of the push button event. Furthermore, the push button event originator can take a corresponding action if the PBR message does not arrive. The preferred action is that a lost or never sent PBR message after a PBS message is considered a PBR message without a specific IEEE P1905.1 address or abstraction layer ID (equivalent to the basic alternative described above).

Referring back to the PBC protocol run of the first embodiment shown in the FIG. 9 as there is only a single push button configuration result message PBR received at all authenticated network node devices (with or without the new network node device) D2 . . . D4, ND, the operation completes successfully.

In an extension of the second embodiment according to the FIG. 14 (FIG. 10), the first (originator of the Push Button Event) network node device D1 may send an OK message to the second network node device D3 (registrar), which however is not shown in the FIG. 14. This provides additional information to the sender of the PBR message (the registrar), especially, if there is no OK message received although one is expected. The sender of the PBR message may request the sending of an OK message by indicating this in the PBR message, for instance, by a flag requesting an OK message from the Push Button Event originator network node device D1.

FIG. 15 shows based on the FIG. 9 and the corresponding description a Push-Button Configuration session running in the heterogeneous home network HNW with the plurality of network node devices D1 . . . D4, ND, AN interconnected to each other via at least one interface and/or over multiple hops thereby exchanging several Push Button Configuration messages according to a first embodiment showing a decentralized message flow respectively Push-Button Configuration session. The dotted message flow indicates that the reception of this message depends on the authentication status or progress of the PBC protocol of a receiving device (unauthenticated vs. authenticated).

FIG. 16 shows based on the FIG. 10 and the corresponding description a Push-Button Configuration session running in the heterogeneous home network HNW with the plurality of network node devices D1 ... D4, ND, AN interconnected to each other via at least one interface and/or over multiple hops thereby exchanging several Push Button Configuration messages according to a second embodiment showing a centralized message flow respectively Push-Button Configuration session.

Receiving Push Button Configuration Result messages (PBR) in the FIGS. 15 and 16

The FIGS. 15 and 16 show each relating to corresponding embodiment that two technology-specific PBC protocol runs are performed, one by the second network node device (registrar) D3 with the new device ND and a further one by a further second network node device (registrar) D4 with a new attacker node device AN. Both registrars D3 and D4 send a PBR message to all network node devices in the network (with or without the new network node device; cf. FIG. 15) or to the Push Button Event originator network node device D1 (initiator network node device; cf. FIG. 16). As more than one PBR message is received (resp. PBR messages for more than one new network node device), all network node devices in the network (with or without the new network node device) (cf. FIG. 15) or to the Push Button Event originator network node device (cf. FIG. 16) know now that more than one PBC protocol run has been performed. This situation is unwanted.

"For a push button event" or "for the same push button event" can be preferably determined according to the alternatives given below:
all messages received and all actions done while a push button event is valid (or active) are considered for the same push button event, or
the tuple {event ID, push button event originator} are the same (if both parameters are given), or
the event ID is the same (if an event ID but no push button event originator is given), or
the push button event originator is the same (if the push button event originator but no event ID is given).

The general rule for the second embodiment (FIG. 16) is:
If there are PBR messages for more than one new device received for a push button event, then a push button authentication overlap has happened, and more than the planned one device have been admitted to the P1905.1 network.

Every unique new device from PBR messages with a specific new device ID will count towards this, as well as every PBR message without a specific new device ID. Two PBR messages without a specific new device ID increase the count by two.

The general rule for the first embodiment (FIG. 15) is:
Let nPBR be the number of received PBR messages for distinct new devices for a push button event. Every unique new device from PBR messages with a specific new device ID will count towards this, as well as every PBR message without a specific new device ID. Two PBR messages without a specific new device ID increase the count by two.

It might be the case, that a new device receives PBR messages about the PBC protocol run that actually authenticated it. This happens if the PBR messages are only sent after the PBC protocol run successfully finished. Such a PBR message, where the IEEE P1905.1 address or abstraction layer ID are the same as the IEEE P1905.1 address or abstraction layer ID of the recipient device, must not be counted towards nPBR. If at least one of the event ID and the push button event originator is given in the PBR message, the PBR message will not be counted at the new device, because the event ID and push button event originator from the PBR message are different than the event ID and push button event originator at the new device. This indicates that these are different push button events.

Let mPBC be the number of PBC protocol runs at a node for distinct new devices. In the FIG. 12 mPBC is 1 for all devices D11, D12, and D13.

Note:
The PBR messages that a network node device sends as the originator are not counted towards nPBR (because it is usually not received by the originating device). The number of these PBR messages is the same as mPBC, and those two concepts (self-PBR messages or mPBC) can be used in an implementation to determine the number of new devices for a push button event.

If (nPBR+mPBC)>1 then for more than one new device a MAC-technology specific PBC protocol run for a given push button event has been performed. A push button authentication overlap has happened, and more than the planned one device have been admitted to the IEEE P1905.1 network. This is the unwanted situation that triggers a roll back of the security credentials established during push button configuration protocol runs for this push button event.

An authenticated network node device may receive multiple PBR messages, because the PBR messages are preferably sent by broadcast (relayed multicast). If an authenticated network node device receives a PBR message it does the following:

Duplicates detection (broadcast copy of message): Only the first copy of a broadcast PBR message is re-broadcast or forwarded to the neighbors according to the IEEE P1905.1 forwarding rules (relayed multicast).

If the device has previously received a PBR message for the same specific new device as given in the received PBR message for the same push button event, then the network node device has two alternatives:

It re-broadcasts or forwards the received PBR message to the neighbors according to the IEEE P1905.1 forwarding rules (relayed multicast).

It discards the PBR message, because the new device has been already counted by the previous PBR message containing the same new device.

This method can only be used for PBR messages, that contain the IEEE 1905.1 address or abstraction layer ID or other ID of a specific new device. PBR messages that do not identify a specific new device cannot be discarded, because they might be issued for different new devices.

The device increases its count of distinct new devices that have been admitted with MAC—technology specific PBC protocol runs for the same push button event. This is preferably done according to the general rule as given above.

As soon as the count of distinct new devices is greater than 1 or if the count of distinct new devices is greater than 1 after a certain time has elapsed, for instance, a certain duration of time after the validation of the push button event, the device initiates the roll-back of the push button configuration protocols.

Initiating Roll-Back of PBC protocol runs in the FIG. 15

There are several alternatives for the procedure for initiating the roll-back of PBC protocol runs if the count of distinct new devices for a push button event is greater than 1:

Alternative 1:

If the second network node device (registrar; D3, D4) performed a PBC protocol run, it initiates the roll-back of these PBC protocol runs for the push button event in question. Thus, when count of distinct new devices is greater than 1, a network node device rolls-back its PBC protocol runs it performed during this push button event.

No additional messages, for instance, PBC roll-back messages, are sent.

Since all the PBR messages are transmitted to all devices in the network, all network node devices that performed a PBC protocol run will receive them, count to greater than 1, and will undo their own PBC protocol runs. This leads to the result that all PBC protocol runs for this push button event are rolled back.

Alternative 2:

If the second network node device (registrar; D3, D4) performed a PBC protocol run, it initiates the roll-back of these PBC protocol runs for the push button event in question. Thus, when the count of distinct new devices is greater than 1, a network node device rolls-back its PBC protocol runs it performed during this push button event.

Furthermore, the device sends a Push Button Configuration Roll-Back message to all network node devices in the network. This will trigger the roll-back of the PBC protocol runs for this push button event at all other network node devices.

Alternative 3:

Independent of whether the network node device performed a PBC protocol run or not, the network node device sends a Push Button Configuration Roll-Back (PBRB) message to all network node devices in the network. This will trigger the roll-back of the PBC protocol runs for this push button event at all other network node devices.

Since all network node devices sent a PBRB message, this network node device will also receive a PBRB message on which it will roll-back its own PBC protocol runs.

Sending Push Button Roll Back messages (PBRB) in the FIGS. 15 and 16

By sending a Push Button Roll Back message according to the above alternatives of the first embodiment (FIG. 15), the whole network is informed in the same way as it was informed about the push button event by the PBN message. This is preferably done by a network-wide broadcast, or relayed multicast as named in IEEE P1905.1. The recipients of the PBRB message perform a roll-back operation, if applicable (same push button event, device actually performed a PBC protocol run), i.e. the credentials established with the new device are deactivated resp. deleted.

According to the second embodiment (FIG. 16), where the PBR message has been sent only to the Push Button Event originator network node device D1, the first (originator) network node device D1 sends a push button roll back message PBRB due to the unwanted situation of a push button authentication overlap. Here, the whole network is informed in the same way as it was informed about the push button event by the PBN message. This is preferably done by a network-wide broadcast, or relayed multicast as named in IEEE P1905.1. Alternatively, multiple PBRB message may be sent by unicast to the network node devices from which a PBR message was received: Thus, one message is sent to the second network node device D3 and one further is sent to the second network node device D4. The second network node devices D3, D4 perform a roll-back operation, i.e. the credentials established with the new device ND, AN are deactivated resp. deleted.

The Push Button Roll Back message (PBRB) preferably contains one or more of the following information:

Both Embodiments

Being a push button roll back: This can be indicated by a unique message identifier (message type) for the message, or by a unique TLV ID (TLV type) for a push button roll back TLV or information element or a header field included in a message.

Both Embodiments

Identifier (ID) of the push button event: Such a unique event ID allows one to distinguish different push button events. The event ID is the same as the event ID of the push button event notification that permitted the multiple push button configuration runs for more than one new device. The event ID allows it to relate the PBRB message to the right push button event (notification) even if the corresponding push button event is not valid anymore.

First Embodiment

Push button event originator: This is the IEEE P1905.1 address or abstraction layer ID of the push button event originator. It eliminates any possible ambiguities with the event ID. The address of the push button event originator can be given by a corresponding field in a push button notification TLV or information element included or a header field in a message.

Second Embodiment

Push button event originator: This is the IEEE P1905.1 address or abstraction layer ID of the sender of the PBRB message. It had sent the corresponding Push Button Notification messages previously. The address of the push button event originator network node device eliminates any possible ambiguities with the event ID. The address of the push button event originator network node device can be given by the sender address of the message (if available) or by a corresponding field in a header field or a push button notification TLV or information element included in a message. The latter keeping all necessary or interesting information into the same scope (of the TLV).

Both Embodiments

IEEE P1905.1 address or abstraction layer ID of the IEEE P1905.1 registrar device(s): This information is more or less only useful, if only the listed registrar devices instead of all devices shall perform the PBC roll back for a specific push button event. This is useful, for instance, if additional information makes it possible to distinguish between a wanted PBC authentication and an unwanted PBC authentication. Since the IEEE P1905.1 registrar devices are the recipients (first embodiment) or destinations (second embodiment) of the PBRB messages, the PBRB messages can be sent to the required P1905.1 registrar devices by unicast, or by a network-wide broadcast message with a list of one or more required IEEE P1905.1 registrar devices.

Both Embodiments

The push button rollback message might contain the list of one or more new (attacker) device identifiers for which the credentials should be rolled back. This should be done via a technology specific PBC rollback. This message can be optionally sent to all network node devices in the network which also accommodates for handling the case where the initial Push Button Notification PBN was sent by the new device or the attacker node device.

Both Embodiments

The push button rollback message might contain the list of one or more new (attacker) device identifiers for which the credentials should be rolled back. If a technology specific PBC roll-back is not possible then the push button rollback message should be sent to all network node devices in the network which can then take appropriate measures to lock out the network node devices specified by the above push button rollback message from participating in the network. This can be done for example by not forwarding or accepting messages from network node devices in the above black-list, and also not routing any messages via such network node devices.

Receiving Push Button Roll Back messages (PBRB) in the FIGS. 15 and 16

When an IEEE P1905.1 registrar device receives a Push Button Roll Back message, it performs a roll-back operation, i.e. the credentials established with the new device for the valid (or active) push button event (if no event ID or push button event originator network node device are given in the PBRB), or for the push button event with the event ID and from the push button event originator network node device (if given in the PBRB), or for the push button event with the event ID (if an event ID but no push button event originator network node device is given in the PBRB), or for the valid (or active) push button event from the push button event originator (if the push button event originator network node device but no event ID is given in the PBRB) are deactivated resp. deleted.

If the PBRB message contains a list of one or more IEEE P1905.1 registrar devices, the recipient of the PBRB message performs the roll-back only if its IEEE P1905.1 address or abstraction layer ID is included in this list of IEEE P1905.1 registrar devices.

Since potentially multiple devices sent a PBRB message by broadcast, the recipient preferably re-broadcasts or forwards (according to the IEEE P1905.1 relayed multicast procedures) only the first received PBRB message for a certain push button event.

The following summary of aspects is related especially to the second embodiment.

The second embodiment proposes mechanisms to detect overlapping technology specific Push Button Configurations. It does this by collecting information about simultaneously running or simultaneously completed technology specific PBC protocols. Simultaneously in this context implies with a time-overlap within a specified granularity, e.g. completed within 120 seconds from one another etc.

Consider an IEEE P1905.1 network comprising of nodes D1-D4 (cf. FIG. 10 and FIG. 16). The network node devices D1-D4 are authenticated IEEE P1905.1 devices which are a part of the home network HNW. The network node devices of the IEEE P1905.1 home network may be connected to each other via multiple hops, and over multiple different technologies. The new device ND is a new IEEE P1905.1 device which should be allowed to join the home network. The node device AN is an attacker which tries to maliciously join the home network. Let Pid(Device), denote the IEEE P1905.1 EUI 48 abstraction layer identifier of the "Device". In our example Pid(D1)=D1, Pid(D2)=D2, . . . , Pid(D4)=D4, Pid(ND)=ND, and Pid(AN)=AN.

As specified in the second embodiment the Push Button Notification PBN is sent by the device of the home network which initiated the initial Push Button Event. In FIG. 10 the network node device D1 initiates the sending of the PBN message triggered by a push button event (a physical or a virtual button press). The PBN message is sent to all network node devices in the home network. As a variant the proposal specifies the PBN message sent by the network node device D1 contains the following: type identifier (TLV or other field which identifies the message as a push button notification message), an identifier for the PBN and the corresponding push button event, this is a random sequential number generated by the network node device D1, let us assume that here this is 0; and also the identifier (either the abstraction layer unique identifier or MAC identifier or some other unique identifier for the device), in this case the ID of the network node device D1. All the network node devices receiving this PBN message as well as the network node device which sent the PBN message shall record it (at least for the specified PBC walk time). A similar mechanism takes place for the network in FIG. 16 till the PBN message is received by the network node devices in the home network.

Now consider the two different cases, Case1: the network in FIG. 10 and Case2: the network in FIG. 16. In Case1 we have only a single new node ND wanting to join the network. In Case2 we have in parallel to the new device ND and attacker device AD trying to maliciously join the network.

For Case1 the new device triggers a push button event (either physical button press, or a virtual button press) to indicate its intention to join the IEEE P1905.1 home network. It thereby triggers a technology specific PBC with the network node device D3. As specified in the embodiment, when the Abstraction Layer Management Entity (ALME) at the network node device D3 is aware of the ongoing or initiated technology specific PBC it can optionally send a PBS message to the initiator of the PBN message (in this case network node device D1). The PBS message contains elements identifying the sender network node device D3, and if available at the time of sending information about the node which is being sponsored to join the network (in this case the identifier of the network node device D3).

After using the means presented in the embodiment the ALME at the network node device D3 gets feedback of the completion of the technology specific PBC protocol. In both Case1 and Case2 this will result in network node device D3 sending a PBR message to the initiator of the initial PBN (here the network node device D1). As specified the PBR message in the simplest variant contains information identifying the message as a PBR message (e.g. a TLV or field or flag which identifies the message as a PBR message). In addition it may contain the identifier of the node which has been introduced into the home network via the technology specific Push Button Configurations PBC and the identifier of the sender.

In Case1 the identifier of the new node being sponsored by the message sent by the network node device D3 is the new device ND. In Case2 (FIG. 16), we have the case of the node AN also initiating a parallel technology specific Push Button Configuration with the network node device D4. This leads to the network node device D1 receiving two PBR messages within a specified time interval. The first PBR message is similar to the one for Case1, and the second PBR message is sent by the network node device D4 to the network node device D1. The second PBR message identifies as sender the network node device D4 and where possible specifies the identity of the network node device being sponsored i.e. the attacker node device AN.

The network node device which receives the PBR messages (D1) collects the messages in both the cases (Case1 and Case2). If more than one PBR messages are received by the network node device D1 then it recognizes the case of overlapping technology specific Push Button Configurations (also across different technologies). In Case1 only a single technology specific PBC is identified so no further action is needed. In Case2, the network node device D1 recognizes two technology specific Push Button Configurations which causes the network node device D1 to issue a Push Button Rollback Message (PBRB). This message in an alternative of the second embodiment is sent to all the network node devices in the network and would lead to the first embodiment. The PBRB message may contain the list of nodes for which the Push Button Configuration credentials need to be rolled back. In this case depending on the implementation it can be the new device ND and the attacker node AN or only the attacker node AN. If the node of the home network which receives the PBRB message had recently carried out a technology specific Push Button Configuration for the network node devices specified in the PBRB message a rollback is initiated. Further actions as specified in the embodiment may be initiated.

Thus, as seen from above the embodiment is able to recognize overlapping Push Button Configurations across heterogeneous technologies and also handle these.

FIG. 17 shows the structure of the first and second network node devices D1 . . . D4 for processing the extended Push Button Configuration based on the abstraction layer embedded in the IEEE P1905.1-Architecture above the Media Access Control (MAC)-layer and the Physical layer according to FIG. 2. According to FIG. 17 the first and second network node devices D1 . . . D4 comprise in contrast to the network node device NND of FIG. 2 dedicated means namely means for performing a Push Button Event (PBE) M1, means for running a Push-Button Configuration Protocol and initiating a Push-Button Configuration Roll-Back Procedure (PBHP) M2 and means for sending/receiving information and/or messages M3. While the means M3 include or incorporate all entities of the IEEE P1905.1-Architecture belonging to the Physical Layer and the means M1 include respectively incorporate the entities of the IEEE P1905.1-Architecture belonging to the Application Layer entities, which are part of the Higher Layer Entities (HLE), the means for running the Push Button Handshake Procedure M2 include respectively incorporate all entities in the data- and management plane of the IEEE P1905.1-Architecture from the MAC-Layer including the Abstraction Layer with the IEEE P1905.1 Abstraction Management Entity (ALME) and the corresponding Service Access Points (SAP) via the Logical Link Control (LLC) up to the Higher Layers with its most entities.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* V. *DIRECTV*, 69 USPQ2d 1865 (Fed. Cir. 2004).

The invention claimed is:

1. A method for running Push-Button Configuration sessions within a heterogeneous network with a plurality of network node devices interconnected to each other over multiple hops via at least one interface, comprising:
   sending a notification message about a first Push-Button Event from a first network node device to at least two second network node devices,
   wherein the first and the at least two second network node devices are authenticated for the network,
   wherein the first Push-Button-Event is assigned to the first network node device,
   wherein the sending of the notification message is triggered by the first Push-Button Event, whereby the at least two second network node devices become authenticating second network node devices;
   authenticating at least two third network node devices each by a second Push-Button-Event, wherein the at least two third network node devices are not yet authenticated for the network,
   wherein the second Push-Button-Event is assigned to each of the third network node devices to run a Push-Button Configuration Protocol,
   wherein the at least two third network node devices are authenticated for the network either with (1) the first network node device and one of the two authenticating second network node device or (2) the at least two authenticating second network node devices; and
   after authenticating the at least two third network node devices, performing a Push-Button Configuration Roll-Back procedure using either (1) the first network node device and the authenticating second network node device or (2) the at least two authenticating second network node devices,
   wherein the Push Button Configuration Roll Back procedure discredits credentials established when authenticating the at least two third network node devices;
   running the first Push-Button Configuration Roll-Back procedure and a second Push-Button Configuration Roll-Back procedure both via at least one method selected from:
   internally within the first network node device and directly with the first network node device;
   indirectly via a non-authenticating second network node between the authenticating second network node device and the first network node device by handshaking messages;
   both each directly with the first network node device; and
   indirectly via a non-authenticating second network node device between the authenticating second network node device and the first network node device by handshaking messages.

2. The method according to claim 1, further comprising:
   initiating the Push-Button Configuration Roll-Back procedure by initiating network node devices,
   running the Push-Button Configuration Protocol in Push-Button Configuration Protocol runs,
   transmitting a first Push-Button Configuration result message by broadcast or by relayed multicast from the initiating network node devices to all network node devices in the heterogeneous network, wherein the first Push-Button Configuration result message includes a message identifier and a message source identifier in a message header field, comparing with each initiating network node device Push-Button Configuration result messages, to count a number of different first Push-Button Configuration result messages, wherein the comparison is based on the message identifier and message source identifier, and if the number of different first Push-Button Configuration result messages is greater than 1, performing at least one process selected from:

(a) each of the initiating network node devices rolls back running of the Push-Button Configuration Protocol with the authenticated third network node device and deletes or deactivates the credentials established with the authenticated third network node device or (b) each of the initiating network node devices rolls back running of the Push-Button Configuration Protocol with the authenticated third network node device, deletes or deactivates the credentials established with the authenticated third network node device and sends a Push-Button Configuration roll-back message to all other network node devices in the network in order to trigger rolling back of the Push-Button Configuration Protocol runs with the authenticated third network node device at other network node devices.

3. The method according to claim 1, further comprising:

initiating the Push-Button Configuration Roll-Back procedure by initiating network node devices, running the Push-Button Configuration Protocol in Push-Button Configuration Protocol runs, transmitting a first Push-Button Configuration result message by broadcast or by relayed multicast from the initiating network node devices to all network node devices in the heterogeneous network, wherein the first Push-Button Configuration result message includes a message identifier and a message source identifier in a message header field, comparing with each network node device in the network, whether it has initiated a Push-Button Configuration Roll-Back procedure or not, Push-Button Configuration result messages, to count a number of different first Push-Button Configuration result messages, wherein the comparison is based on the message identifier and message source identifier, and if the number of different first Push-Button Configuration result messages is greater than 1, each network node device in the network, whether it has initiated a Push-Button Configuration Roll-Back procedure or not, sends a Push-Button Configuration roll-back message to all other network node devices in the network in order to trigger rolling back of the Push-Button Configuration Protocol runs with the authenticated third network node device at other network node devices.

4. The method according to claim 1, further comprising:

initiating the Push-Button Configuration Roll-Back procedure by initiating network node devices, running the Push-Button Configuration Protocol n Push-Button Configuration Protocol runs, transmitting a first Push-Button Configuration result message by broadcast or by relayed multicast from the initiating network node devices to all network node devices in the heterogeneous network, wherein the first Push-Button Configuration result message includes, in a TLV-part or an information element or in header field of the message, at least one of a first identifier indicating sender or originator of the Push-Button Configuration result message, a second identifier indicating an address of the first network node device as originator of the first Push-Button-Event, and a third identifier indicating an event ID of the first Push-Button-Event:

comparing with each initiating network node devices Push-Button Configuration result messages, to count a number of different first Push-Button Configuration result messages, wherein the comparison is performed based on at least one of the first identifier, the second identifier and the third identifier, and if the number of different first Push-Button Configuration result messages is greater than 1 performing at least one process selected from:

(a) each of the initiating network node devices rolls back running of the Push-Button Configuration Protocol with the authenticated third network node device and deletes or deactivates the credentials established with the authenticated third network node device or (b) each of the initiating network node devices rolls back running of the Push-Button Configuration Protocol with the authenticated third network node device, deletes or deactivates the credentials established with the authenticated third network node device and sends a Push-Button Configuration roll-back message to all other network node devices in the network in order to trigger rolling back of the Push-Button Configuration Protocol runs with the authenticated third network node device at other network node devices.

5. The method according to claim 1, further comprising:

initiating the Push-Button Configuration Roll-Back procedure by initiating network node devices, running the Push-Button Configuration Protocol in Push-Button Configuration Protocol runs, transmitting a first Push-Button Configuration result message by broadcast or by relayed multicast from the initiating network node devices to all network node devices in the heterogeneous network, wherein a first Push-Button Configuration result message includes, in a TLV-part or an information element or a header field of the message, at least one of a first identifier indicating sender or originator of the Push-Button Configuration result message, a second identifier indicating an address of the first network node device as originator of the first Push-Button-Event, and a third identifier indicating an event ID of the first Push-Button-Event, comparing with each network node device in the network, whether it has initiated a Push-Button Configuration Roll-Back procedure or not, Push-Button Configuration result messages, to count a number of different first Push-Button Configuration result messages, wherein the comparison is performed based on at least one of the first identifier, the second identifier, and the third identifier, and if the number of different first Push-Button Configuration result messages is greater than 1, each network node device in the network, whether it has initiated a Push-Button Configuration Roll-Back procedure or not, sends a Push-Button Configuration roll-back message to all other network node devices in the network in order to trigger rolling back of the Push-Button Configuration Protocol runs with the authenticated third network node device at other network node devices.

6. The method according to claim 1, further comprising:

initiating the Push-Button Configuration Roll-Back procedure by initiating network node devices, running the Push-Button Configuration Protocol in Push-Button Configuration Protocol runs, transmitting a first Push-Button Configuration result message by broadcast or by relayed multicast from the initiating network node devices to all network node devices in the heterogeneous network, wherein a first Push-Button Configuration result message includes in a TLV-part or an information element an address or abstraction layer identifier of the third network node device, comparing with each initiating network node devices Push-Button Configuration result messages, to count a number of different first Push-Button Configuration result messages, wherein the comparison is performed based on the address or abstraction layer identifier of the third network node devices, and if the number of different first Push-Button Configuration result messages is greater than 1 performing at least one process selected from:

(a) each of the initiating network node devices rolls back running of the Push-Button Configuration Protocol with the authenticated third network node device and deletes or deactivates the credentials established with the authenticated third network node device or (b) each of the initiating network node devices rolls back running of the Push-Button Configuration Protocol with the authenticated third network node device, deletes or deactivates the credentials established with the authenticated third network node device and sends a Push-Button Configuration roll-back message to all other network node devices in the network in order to trigger rolling back of the Push-Button Configuration Protocol runs with the authenticated third network node device at other network node devices.

7. The method according to claim 1, further comprising:

initiating the Push-Button Configuration Roll-Back procedure by initiating network node devices, running the Push-Button Configuration Protocol in a Push-Button Configuration Protocol runs, transmitting a first Push-Button Configuration result message by broadcast or by relayed multicast from the initiating network node devices to all network node devices in the heterogeneous network, wherein a first Push-Button Configuration result message includes in a TLV-part or an information element an address or abstraction layer identifier of the third network node device, comparing with each initiating network node device-Push-Button Configuration result messages, to count a number of different first Push-Button Configuration result messages, wherein the comparison is performed based on the address or abstraction layer identifier of the third network node device, and if the number of different first Push-Button Configuration result messages is greater than 1, each network node device in the network whether it has initiated a Push-Button Configuration Roll-Back procedure or not sends a Push-Button Configuration roll-back message to all other network node devices in the network in order to trigger rolling back of the Push-Button Configuration Protocol runs with the authenticated third network node device at other network node devices.

8. The method according to claim 1, further comprising:

initiating with an initiating second network node device the Push-Button Configuration Roll-Back procedure, wherein a non-initiating second network node device does not initiate the Push-Button Configuration Roll-Back procedure, running the Push-Button Configuration Protocol in Push-Button Configuration Protocol runs, sending a second Push-Button Configuration result message from each initiating second network node device directly or indirectly via at least one non-initiating second network node device to the first network node device, wherein the second Push-Button Configuration result message as one handshake message includes a message identifier and a message source identifier in a message header field, and the first network node device:

(a) initiates itself the Push-Button Configuration Roll-Back procedure and rolls back running of the Push-Button Configuration Protocol with the authenticated third network node device, deletes or deactivates the credentials established with the authenticated third network node device and sends a Push-Button Configuration roll-back message as another handshaking message directly or indirectly via at least one non-initiating second network node device to the initiating second network node device in order to trigger rolling back of the Push-Button Configuration Protocol run with the authenticated third network node device at the initiating second network node device or respectively (b) does not initiate itself the Push-Button Configuration Roll-Back procedure, but performs a comparison of the second Push-Button Configuration result messages received to count a number of different second Push-Button Configuration result messages, the comparison being performed based on the message identifiers and message source identifiers, and if the number of different second Push-Button Configuration result messages is greater than 1, the first network node device sends a Push-Button Configuration roll-back message as another handshaking message directly or indirectly via the at least one non-initiating second network node device to the at least two initiating second network node devices in order to trigger rolling back of the Push-Button Configuration Protocol runs with the authenticated third network node device at the at least two initiating second network node devices.

9. The method according to claim 1, further comprising:

initiating with an initiating second network node device the Push-Button Configuration Roll-Back procedure, wherein a non-initiating second network node device does not initiate the Push-Button Configuration Roll-Back procedure, running the Push-Button Configuration Protocol in Push-Button Configuration Protocol runs, sending a second Push-Button Configuration result message from each initiating second network node device directly or indirectly via at least one non-initiating second network node device to the first network node device, wherein the second Push-Button Configuration result message as one handshake message includes, in a TLV-part or an information element or a header field of the message, at least one of a first identifier indicating sender or originator of the Push-Button Configuration result message, a second identifier indicating an address of the first network node device as originator of the first Push-Button-Event and as receiver of the second Push-Button Configuration result message (PBR), and a third identifier indicating an event ID of the first Push-Button-Event, comparing second Push-Button Configuration result messages, to count a number of different second Push-Button Configuration result messages, wherein the comparison is performed based on at least one of the first identifier, the second identifier and the third identifier, and the first network node device:

(a) initiates itself the Push-Button Configuration Roll-Back procedure, if the comparison is an internal comparison in the first network node device and the comparison shows the number of different second Push-Button Configuration result messages is greater than 1, the first network node device itself rolls running of the Push-Button Configuration Protocol with the authenticated third network node device, deletes or deactivates the credentials established with the authenticated third network node device and sends a Push-Button Configuration roll-back message as another handshaking message via at least one non-initiating second network node device to the initiating second network node device in order to trigger rolling back of the Push-Button Configuration Protocol run with the authenticated third network node device at the initiating second network node device or respectively, (b) does not itself initiate the Push-Button Configuration Roll-Back procedure, but performs the comparison on the second Push-Button Configuration result messages received and if the number of different second Push-Button Configuration result messages is greater than 1, sends a Push-Button Configuration roll-back message as another handshaking message directly or indirectly via the at least one non-initiating second network node device to the at least two initiating second network node devices in order to trigger rolling back of the Push-Button Configuration Protocol runs with the authenticated third network node device at the at least two initiating second network node devices.

10. The method according to claim 1, further comprising:

initiating with an initiating second network node device the Push-Button Configuration Roll-Back procedure, wherein a non-initiating second network node device does not initiate the Push-Button Configuration Roll-Back procedure, running the Push-Button Configuration Protocol in Push-Button Configuration Protocol runs, sending a second Push-Button Configuration result message from each initiating second network node device directly or indirectly via at least one non-initiating second network node device to the first network node device, wherein the second Push-Button Configuration result message as one handshake message includes in a TLV-part or an information element an address or abstraction layer identifier of the third network node devices, comparing second Push-Button Configuration result messages received, to count a number of different second Push-Button Configuration result messages, wherein the comparison is performed based on the address or abstraction layer identifier of the third network node devices, and the first network node device:

(a) initiates itself the Push-Button Configuration Roll-Back procedure, if, based on the address or abstraction layer identifier, the number of different third network node devices is greater than 1, the first network node device itself rolls back running of the Push-Button Configuration Protocol with the authenticated third network node device, deletes or deactivates the credentials established with the authenticated third network node device and sends a Push-Button Configuration roll-back message as another handshaking message directly or indirectly via at least one non-initiating second network node device to the initiating second network node device in order to trigger rolling back of the Push-Button Configuration Protocol run with the authenticated third network node device at the initiating second network node device or respectively (b) does not itself initiate the Push-Button Configuration Roll-Back procedure, but performs the comparison, and if the number of different second Push-Button Configuration result messages is greater than 1, the first network node device sends a Push-Button Configuration roll-back message as another handshaking message directly or indirectly via the at least one non-initiating second network node device to the at least two initiating second network node devices in order to trigger rolling back of the Push-Button Configuration Protocol runs with the authenticated third network node device at the at least two initiating second network node devices.

11. The method according to claim 2, wherein the Push-Button Configuration roll-back message includes a message identifier and a message source identifier in a message header field, or in a TLV-part, or an information element, a first identifier indicating the address of the first network node device as the originator of the first Push-Button-Event and as the sender of the second Push-Button Configuration roll-back message, a second identifier indicating an event ID of the first Push-Button-Event, or a third identifier indicating an address or abstraction layer identifier of the at least one network node device as registrar.

12. The method according to claim 2, further comprising sending a first Push-Button status message to all network node devices in the heterogeneous network and before the first Push-Button Configuration result message in order to announce the first Push-Button Configuration result message.

13. The method according to claim 8, further comprising sending a second Push-Button status message to the first network node device and before the second Push-Button Configuration result message in order to announce the second Push-Button Configuration result message.

14. The method according to claim 2, further comprising counting, with each of the at least two network node devices initiating the Push-Button Configuration Roll-Back procedure, the number of the first Push-Button Configuration result messages only within a time period, starting from the first Push-Button-Event or the reception of the notification message.

15. The method according to claim 8, further comprising counting, with the first network node device, the number of the second Push-Button Configuration result messages only within a time period, starting from the first Push-Button-Event.

16. The method according to claim 4, wherein the first Push-Button Configuration result messages sent and received or received are different to each other if the first identifier is different and the second identifier and the third identifier are equal or the same.

17. A method for running Push-Button Configuration sessions within a heterogeneous network with a plurality of network node devices interconnected to each other over multiple hops via at least one interface, the method comprising:

sending a notification message about a first Push-Button Event from a first network node device to at least two second network node devices, wherein the first and second network node devices are authenticated for the network, wherein the first Push-Button-Event is assigned to the first network node device, wherein the sending of the notification message is triggered by the first Push-Button Event, whereby the at least two second network node devices become authenticating second network node devices;

authenticating a third network node device by a second Push-Button-Event, wherein the third network node device is not yet authenticated for the network, wherein the second Push-Button-Event is assigned to the third network node device to run a Push-Button Configuration Protocol with the first network node device or with an authenticating second network node device; and after finishing authentication, transmitting a third Push-Button Configuration result message from the first network node device or the authenticating second network node device, the third Push-Button Configuration result message including at least one of: (i) in a TLV-part or an information element or in header field of the message a first identifier indicating a sender or originator of the Push-Button Configuration result message, a second identifier indicating an address of the first network node device as originator of the first Push-Button-Event or a third identifier indicating an event ID of the first Push-Button-Event and (ii) in a TLV-part or an information element an address or abstraction layer identifier of each third network node device, the third Push-Button Configuration result message being transmitted to all network node devices in the heterogeneous network.

18. A method for running Push-Button Configuration sessions within a heterogeneous network with a plurality of network node devices interconnected to each other over multiple hops via at least one interface, the method comprising:

triggering a first network node device by a first Push-Button-Event assigned to the first network node device;

sending a notification message about a first Push-Button-Event to second network node devices, wherein the first and second network devices are previously authenticated for the network;

triggering a single third network node device by a second Push-Button-Event assigned to the third network device, wherein the single third network node device is not yet authenticated;

authenticating the single third network node device for the network by running a Push-Button Configuration Protocol with the first network node device or with an authenticating second network node device; and after authenticating the third network node device and terminating a Push-Button Configuration session, sending a fourth Push-Button Configuration result message including in a TLV-part or an information element or in the message header field, at least one of a first identifier indicating the sender or originator of the Push-Button Configuration result message, a second identifier indicating the address of the first network node device as originator of the first Push-Button-Event and as the receiver of the fourth Push-Button Configuration result message, and a third identifier indicating an event ID of the first Push-Button-Event or in a TLV-part or an information element an address or abstraction layer identifier of the third network node devices, wherein the fourth Push-Button Configuration result message is sent from the authenticating second network node device via at least one non-authentication second network node device to the first network node device.

19. A network node device for running Push-Button Configuration sessions within a heterogeneous network with a plurality of other network node devices, interconnected to each other over multiple hops via at least one interface, wherein the first network node device is previously authenticated for the network, the device comprising:

(a) Means for performing a first Push-Button-Event, (b) Means for sending/receiving a notification message notifying second authenticated network node devices of the first Push Button Event, wherein the second network node devices are each previously authenticated for the network, (c) Means for running a Push-Button Configuration protocol and a means for initiating a Push-Button Configuration Roll-Back procedure, which are connected with the sending/receiving means and designed such that they:

(c1) run a Push-Button Configuration Protocol with a third network node device not yet authenticated for the network, which is triggered by a second Push-Button-Event assigned to the third network node device to authenticate the third network node device for the network, (c2) after finishing the authentication, in response to transmission of a first Push-Button Configuration result message to all network node devices in the heterogeneous network and receiving a first Push-Button Configuration result message from at least one of the other network node devices, initiate a Push-Button Configuration Roll-Back procedure in order to delete or deactivate credentials established with the authenticated third network node device, if due to a comparison, whether the first Push-Button Configuration result messages being sent and received are different to each other, a number of the first Push-Button Configuration result messages by counting is greater than 1;

wherein the means for running a Push-Button Configuration protocol and the means for initiating a Push-Button Configuration Roll-Back procedure are connected with the sending/receiving means and within the Push-Button Configuration Roll-Back procedure the run of the Push-Button Configuration Protocol with the authenticated third network node device is rolled back and the credentials established with the authenticated third network node device are deleted or deactivated.

20. A network node device according to claim 19, wherein the means for running a Push-Button Configuration protocol and the means for initiating a Push-Button Configuration Roll-Back procedure are connected with the sending/receiving means and designed such that within the Push-Button Configuration Roll-Back procedure the run of the Push-Button Configuration Protocol with the authenticated third network node device is rolled back, the credentials established with the authenticated third network node device are deleted or deactivated and a Push-Button Configuration roll-back message to all other network node devices in the network in order to trigger rolling back of the Push-Button Configuration Protocol runs with the authenticated third network node device at other network node devices is sent.

21. A network node device according to claim 19, wherein the means for running a Push-Button Configuration protocol and the means for initiating a Push-Button Configuration Roll-Back procedure are connected with the sending/receiving means and designed such that within the Push-Button Configuration Roll-Back procedure a Push-Button Configuration roll-back message to all other network node devices in the network in order to trigger rolling back of the Push-Button Configuration Protocol runs with the authenticated third network node device at other network node devices is sent.

22. A network node device according to claim 19, wherein the means for running a Push-Button Configuration protocol and the means for initiating a Push-Button Configuration Roll-Back procedure are designed such that the comparison, whether the first Push-Button Configuration result messages being sent and received are different is based on a message identifier and a message source identifier, a first identifier indicating the sender or originator of the Push-Button Configuration result message, a second identifier indicating the address of the first network node device as the originator of the first Push-Button-Event and/or a third identifier indicating an event ID of the first Push-Button-Event each included in a TLV-part or an information element or in header field of the first Push-Button Configuration result message or an address or abstraction layer identifier of the third network node device included in a TLV-part or an information element of the first Push-Button Configuration result message.

23. A First network node device according to claim 20, wherein the Push-Button Configuration roll-back message includes a message identifier and a message source identifier in a message header field, and/or in a TLV-part or an information element a first identifier indicating the address of the first network node device as the originator of the first Push-Button-Event and as the sender of the second Push-Button Configuration roll-back message, a second identifier indicating an event ID of the first Push-Button-Event and/or a third identifier indicating an address or abstraction layer identifier of the at least one network node device as registrar.

24. A network node device according to one of the claim 19, wherein the means for running a Push-Button Configuration protocol and the means for initiating a Push-Button Configuration Roll-Back procedure are connected with the sending/receiving means and designed such that a first Push-Button status message is sent to all network node devices in the heterogeneous network with or without the third network node devices and before the first Push-Button Configuration result message in order to announce the first Push-Button Configuration result message.

25. A network node device according to claim 19, wherein the means for running a Push-Button Configuration protocol and the means for initiating a Push-Button Configuration Roll-Back procedure are designed such that they count the number of the first Push-Button Configuration result messages only within a time period, starting from the first virtual or physical Push-Button-Event.

26. A network node device according to claim 22, wherein the first Push-Button Configuration result messages being sent and received are different to each other if the first identifier is different and the second identifier and the third identifier are equal or the same.

27. A computer program product for product for running Push-Button Configuration sessions within a heterogeneous network, the computer program product comprising a non-transitory computer-readable storage device having computer-readable program instructions stored therein, wherein the computer readable program instructions when executed by a processor:

sends a notification message about a first Push-Button Event from the first network node device to at least two second network node devices, wherein the first and second network node devices are previously authenticated for the network,
wherein the first Push-Button-Event is assigned to the first network node device,
wherein the sending of the notification message is triggered by the first Push-Button Event
whereby the at least two second network node devices become authenticating second network node devices;
authenticates at least two third network node devices each by a second Push-Button-Event, wherein the at least two third network node devices are not yet authenticated for the network,
wherein the second Push-Button-Event is assigned to each of the third network node devices to run a Push-Button Configuration Protocol,
wherein the at least two third network node devices are authenticated for the network with devices selected from (1) the first network node device and an authenticating second network node device and (2) at least two authenticating second network node devices; and
after authenticating the at least two third network node devices, performs a Push-Button Configuration Roll-Back procedure by either (1) the first network node device and the authenticating second network node device or and (2) the at least two authenticating second network node devices,
wherein the Push Button Configuration Roll Back procedure discredits credentials established when authenticating the at least two third network node devices; and
further comprising means for running a Push-Button Configuration protocol and means for initiating a Push-Button Configuration Roll-Back procedure connected with sending/receiving means and within the Push-Button Configuration Roll-Back procedure the run of the Push-Button Configuration Protocol with the authenticated third network node device is rolled back and the credentials established with the authenticated third network node device are deleted or deactivated.

28. A computer program product for product for running Push-Button Configuration sessions within a heterogeneous network, the computer program product comprising a non-transitory computer-readable storage device having computer-readable program instructions stored therein, wherein the computer readable program instructions when executed by a processor:

sends a notification message about a first Push-Button Event from a first network node device to at least two second network node devices,
wherein the first and second network node devices are previously authenticated for the network,
wherein the first Push-Button-Event is assigned to the first network node device,
wherein the sending of the notification message is triggered by the first Push-Button Event
whereby the at least two second network node devices become authenticating second network node devices;
authenticates a third network node device by a second Push-Button-Event, wherein the third network node device is not yet authenticated for the network, wherein the second Push-Button-Event is assigned to the third network node device to run a Push-Button Configuration Protocol with the first net node device or with an authenticating second network node device; and after finishing authentication, transmits a third Push-Button Configuration result message from the first network node device or the authenticating second network node device, the third Push-Button Configuration result message including at least one of (i) a message identifier and a message source identifier in a message header field (ii) in a TLV-part or an information element or in header field of the message a first identifier indicating a sender or originator of the Push-Button Configuration result message, a second identifier indicating an address of the first network node device as originator of the first Push-Button-Event and/or a third identifier indicating an event ID of the first Push-Button-Event and (iii) in a TLV-part or an information element an address or abstraction layer identifier of each third network node device, the third Push-Button Configuration result message being transmitted by broadcast or by relayed multicast to all network node devices in the heterogeneous network;

further comprising means for running a Push-Button Configuration protocol and means for initiating a Push-Button Configuration Roll-Back procedure connected with sending/receiving means and within the Push-Button Configuration Roll-Back procedure the run of the Push-Button Configuration Protocol with the authenticated third network node device is rolled back and the credentials established with the authenticated third network node device are deleted or deactivated.

29. A network node device for running Push-Button Configuration sessions within a heterogeneous network with a plurality of other network node devices, interconnected to each other network, being authenticated for the network, the network node device comprising:
(a) Means for receiving a notification message triggered by a first Push-Button-Event assigned to a first network node device authenticated for the network, and for sending the notification message to a further second authenticated network node device,
(b) Means for running a Push-Button Configuration protocol and a means for initiating a Push-Button Configuration Roll-Back procedure connected with the means for receiving and for sending and configured to:
(b1) run a Push-Button Configuration Protocol with a third network node device not yet authenticated for the network, which is triggered by a second Push-Button-Event assigned to the third network node device to authenticate the third network node device for the network,
(b2) after finishing the authentication, initiate a Push-Button Configuration Roll-Back procedure to delete or deactivate credentials established with the authenticated third network node device, if the first Push-Button Configuration result messages are different to each other, wherein a first Push-Button Configuration result message is transmitted by broadcast or relayed multicast to all network node devices in the heterogeneous network, and wherein a first Push-Button Configuration result message is received from at least one of the other network node devices or due to at least two first Push-Button Configuration result messages being received from at least one of the other network node devices wherein the means for running a Push-Button Configuration protocol and initiating a Push-Button Configuration Roll-Back procedure are connected with the means for receiving and for sending configured to, within the Push-Button Configuration Roll-Back procedure, roll back the run of the Push-Button Configuration Protocol with the authenticated third network node device and delete or deactivate the credentials established with the authenticated third network node device.

30. A network node device according to claim 29, wherein the means for running a Push-Button Configuration protocol and initiating a Push-Button Configuration Roll-Back procedure are connected with the sending/receiving means and designed such that within the Push-Button Configuration Roll-Back procedure the run of the Push-Button Configuration Protocol with the authenticated third network node device is rolled back, the credentials established with the authenticated third network node device are deleted or deactivated and a Push-Button Configuration roll-back message to all other network node devices in the network in order to trigger rolling back of the Push-Button Configuration Protocol runs with the authenticated third network node device at other network node devices is sent.

31. A network node device according to claim 29, wherein the means for running a Push-Button Configuration protocol and initiating a Push-Button Configuration Roll-Back procedure are connected with the sending/receiving means and designed such that within the Push-Button Configuration Roll-Back procedure a Push-Button Configuration roll-back message to all other network node devices in the network in order to trigger rolling back of the Push-Button Configuration Protocol runs with the authenticated third network node device at other network node devices is sent.

32. A network node device according to claim 29, wherein the means for running a Push-Button Configuration protocol and initiating a Push-Button Configuration Roll-Back procedure are designed such that the comparison, whether the first Push-Button Configuration result messages being sent and received are different is based on a message identifier and a message source identifier, a first identifier indicating the sender or originator of the Push-Button Configuration result message, a second identifier indicating the address of the first network node device as the originator of the first Push-Button-Event and/or a third identifier indicating an event ID of the first Push-Button-Event each included in a TLV-part or an information element or in header field of the first Push-Button Configuration result message or an address or abstraction layer identifier of the third network node device included in a TLV-part or an information element of the first Push-Button Configuration result message.

33. A network node device according to claim 30, wherein the Push-Button Configuration roll-back message includes a message identifier and a message source identifier in a message header field, and/or in a TLV-part or an information element a first identifier indicating the address of the first network node device as the originator of the first Push-Button-Event and as the sender of the second Push-Button Configuration roll-back message, a second identifier indicating an event ID of the first Push-Button-Event and/or a third identifier indicating an address or abstraction layer identifier of the at least one network node device as registrar.

34. A network node device according to claim 29, wherein the means for running a Push-Button Configuration protocol and initiating a Push-Button Configuration Roll-Back procedure are connected with the sending/receiving means and designed such that a first Push-Button status message is sent to all network node devices in the heterogeneous network with or without the third network node devices and before the first Push-Button Configuration result message in order to announce the first Push-Button Configuration result message.

35. A network node device according to claim 29, wherein the means for running a Push-Button Configuration protocol and initiating a Push-Button Configuration Roll-Back procedure are designed such that they count the number of the first Push-Button Configuration result messages only within a time period, starting from the reception of the notification message.

36. A network node device according to claim 32, wherein the first Push-Button Configuration result messages, being sent and received or received, are different to each other if the first identifier is different and the second identifier and the third identifier are equal or the same.

37. A computer program product for product for running Push-Button Configuration sessions within a heterogeneous network with a plurality of network node devices interconnected to each other over multiple hops via at least one interface, the computer program product comprising a non-transitory computer-readable storage device having computer-readable program instructions stored therein, the computer readable program instructions being executable by a processor to:
send a notification message about a first Push-Button Event from a first network node device to at least two second network node devices, wherein the first and second network node devices are previously authenticated for the network,
wherein the first Push-Button-Event is assigned to the first network node device,
wherein the sending of the notification message is triggered by the first Push-Button Event,
whereby the at least two second network node devices become authenticating second network node devices;
authenticating at least two third network node devices each by a second Push-Button-Event,
wherein the at least two third network node devices are not yet authenticated for the network,
wherein the second Push-Button-Event is assigned to each of the third network node devices to run a Push-Button Configuration Protocol,
wherein the at least two third network node devices are authenticated for the network with either (1) the first network node device and an authenticating second network node device or (2) at least two authenticating second network node devices; and
after authenticating the at least two third network node devices, performing a Push-Button Configuration Roll-Back procedure by either (1) the first network node device and the authenticating second network node device or (2) the at least two authenticating second network node devices, wherein the Push Button Configuration Roll Back procedure discredits credentials established when authenticating the at least two third network node devices;
running the first Push-Button Configuration Roll-Back procedure and a second Push-Button Configuration Roll-Back procedure both via at least one method selected from:
internally within the first network node device and directly with the first network node device;
indirectly via a non-authenticating second network node between the authenticating second network node device and the first network node device by handshaking messages;
both each directly with the first network node device; and
indirectly via a non-authenticating second network node device between the authenticating second network node device and the first network node device by handshaking messages.

38. Heterogeneous network with a plurality of network node devices interconnected to each other over multiple hops via at least one interface for running Push-Button Configuration sessions, the network comprising:
a first network node device,
at least one second network node device, and
at least one third network node device, wherein the first network node device comprises:
(a) Means for performing a first Push-Button-Event,
(b) Means for sending/receiving messages triggered by the performing means, to send a notification message about the first Push-Button-Event to the at least one second authenticated network node device authenticated for the network,
(c) Means for running a Push-Button Configuration protocol and initiating a Push-Button Configuration Roll-Back procedure, which are connected with the sending/receiving means and configured to:
(c1) run a Push-Button Configuration Protocol with a third network node device not yet authenticated for the network, which is triggered by a second Push-Button-Event assigned to the third network node device to authenticate the third network node device for the network,
(c2) after finishing the authentication, due to a first Push-Button Configuration result message to be transmitted and due to a first Push-Button Configuration result message received from at least one of the other network node devices initiate a Push-Button Configuration Roll-Back procedure to delete or deactivate credentials established with the authenticated third network node device, if due to a comparison, whether the first Push-Button Configuration result messages being sent and received are different to each other, a number of the first Push-Button Configuration result messages by counting is greater than 1;
wherein the means for running a Push-Button Configuration protocol and initiating a Push-Button Configuration Roll-Back procedure are connected with the means for receiving and for sending configured to, within the Push-Button Configuration Roll-Back procedure, roll back the run of the Push-Button Configuration Protocol with the authenticated third network node device and delete or deactivate the credentials established with the authenticated third network node device.

* * * * *